(12) United States Patent
Abiven

(10) Patent No.: US 6,847,637 B1
(45) Date of Patent: Jan. 25, 2005

(54) UNIT AND METHOD FOR SWITCHING DATA PACKETS, A DATA PROCESSING APPARATUS COMPRISING SUCH A UNIT AND A NETWORK COMPRISING THEM

(75) Inventor: Anne Abiven, Cesson Sevigne Cedex (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,053

(22) Filed: Apr. 7, 2000

(30) Foreign Application Priority Data

Apr. 8, 1999 (FR) ............................................. 99 04418
Apr. 8, 1999 (FR) ............................................. 99 04417

(51) Int. Cl.[7] .............................................. H04L 12/28
(52) U.S. Cl. ........................ 370/360; 370/389; 370/536
(58) Field of Search ................................ 370/230, 235, 370/396, 400, 352, 353, 354, 355, 356, 360, 362, 363, 364, 365, 366, 367, 381, 383, 384, 386, 387, 388, 389, 536, 537

(56) References Cited

U.S. PATENT DOCUMENTS

| | | | | |
|---|---|---|---|---|
| 5,210,743 A | * | 5/1993 | Eilenberger et al. ......... | 370/422 |
| 5,371,852 A | * | 12/1994 | Attanasio et al. ........... | 709/245 |
| 5,774,665 A | | 6/1998 | Jeong et al. ............ | 395/200.48 |
| 5,787,086 A | * | 7/1998 | McClure et al. ............ | 370/413 |
| 5,920,699 A | * | 7/1999 | Bare ............................. | 709/225 |
| 6,009,092 A | * | 12/1999 | Basilico ....................... | 370/352 |
| 6,032,205 A | * | 2/2000 | Ogimoto et al. .............. | 710/33 |
| 6,094,435 A | * | 7/2000 | Hoffman et al. ............. | 370/414 |
| 6,104,696 A | * | 8/2000 | Kadambi et al. ............ | 370/218 |
| 6,160,811 A | * | 12/2000 | Partridge et al. ............ | 370/401 |
| 6,396,807 B1 | * | 5/2002 | Peligry et al. ............... | 370/230 |

FOREIGN PATENT DOCUMENTS

| | | |
|---|---|---|
| EP | 405990 | 6/1990 |
| EP | 884876 | 12/1998 |
| WO | WO 98/19421 | 5/1998 |

OTHER PUBLICATIONS

May, D. et al., "Message–Routing als Schlusseltechnik", Elektronik, DE, Franzis Verlag GMBH. Munchen, vol. 41, No. 24, pp. 58–59, 62–66.

Waadeland, T. et al., "Avoiding head–of–line blocking in wormhole routed networks by central buffering", Microprocessors And Microsystems, GB, IPC Business Press LTD. London, vol. 21, No. 7–8, (Mar. 30, 1998), pp. 455–462.

Chowdhury, S., et al., "Threshold–Based Load Balancing In An ATM Switch Consisting Of Parallel Output Buffered Switch Elements", Proceedings Of The Global Telecommunications Conference (GLOBECOM), US, New York, IEEE, 1994, pp. 463–469.

(List continued on next page.)

*Primary Examiner*—Wellington Chin
*Assistant Examiner*—William Schultz
(74) *Attorney, Agent, or Firm*—Fitzpatrick, Cella, Harper & Scinto

(57) ABSTRACT

The invention concerns a data packet switching unit (26) associated with a node (20) in a network (10) and having several input/output ports for the packets.

The unit is wherein it has:
- a number n of intermediate ports (70, 80, 90, 100) disposed between input/output ports of a first (40, 50, 60) and second (C) type, a port of the second type being able to support an internal connection to the node (20),
- at least one storage means (72, 77) associated with each intermediate port,
- means (A) of transferring a packet between at least one so-called input port and at least one so-called output port and which uses at least one intermediate port and said at least one associated storage means.

60 Claims, 29 Drawing Sheets

OTHER PUBLICATIONS

Hiroshi Suzuki, et al., "Output–Buffer Switch Architecture For Asynchronous Transfer Mode", International Conference On Communications, US, New York, IEEE, vol. _, 1989, pp. 99–103.

Brown, C.R., et al., "Exploiting IEEE 1355 Routable Serial Links In A Real–Time Vision Architecture", Real–Time Imaging, GB, Academic Press Limited, vol. 3, No. 5, (Jan. 10, 1997), pp. 355–361.

* cited by examiner

Figure 9a

| Input port number | Output port number |
|---|---|
| 40 | — |
| 50 | — |
| 60 | — |
| 70 | — |
| 80 | — |
| 90 | — |
| 100 | — |

Figure 9b

| Input port number | Output port number |
|---|---|
| 40 | 50 |

Figure 9c

| Input port number | Output port number |
|---|---|
| 40 | 70 |

Figure 9d

| Input port number | Output port number |
|---|---|
| 40 | — |
| 50 | — |
| 60 | — |
| 70 | 40 |
| 80 | — |
| 90 | — |
| 100 | — |

Figure 9e

| Input port number | Output port number |
|---|---|
| 40 | 70 |
| 50 | 80 |
| 60 | 90 |
| 70 | 40 |
| 80 | 50 |
| 90 | 60 |

UNIT AND METHOD FOR SWITCHING DATA PACKETS, A DATA PROCESSING APPARATUS COMPRISING SUCH A UNIT AND A NETWORK COMPRISING THEM

According to a first aspect, the present invention concerns a unit for switching data packets associated with a communication node of a network, said switching unit having several input/output ports for the data packets.

There is known, from the document EP 0 405 990, a network of computers which have several communication nodes consisting of computers and at least one switching unit which effects the switching of data packets through said network.

The switching unit has 32 input/outputs consisting of physical ports, all identical, which are adapted each to support a point to point connection and thus make it possible to transfer data packets from one communication node in the network to another communication node in this same network.

The switching unit has notably an input for receiving data packets coming from a communication node, referred to as the source, and a plurality of outputs identifying several other communication nodes, referred to as destinations.

This switching unit connects, internally, the above mentioned input to one of the outputs of said switching unit.

This output is determined selectively according to the indication of the destination node placed in the identification data constituting the header of the data packet which was received at said input.

The switching of the data packet in the switching unit of the network of computers is effected by reading the header of said data packet, even before the entire packet is received in said switching unit, which makes it possible not to have to store the data packet.

Thus the waiting time between the reception of the data packet at the switching node and its exit is reduced.

This switching unit is associated with a communication node.

Certain physical ports of the switching unit are connected to a serial/parallel adapter external to said switching unit and which, itself, supports an internal connection to the communication node with which the switching unit is associated.

Before such a switching unit is brought into service, provision may be made for associating some of the physical ports with each other and, for example, for connecting one or more ports to one or more serial/parallel adapters each supporting an internal connection to the communication node.

Thus, when a data packet is received by one of the physical ports of the switching unit, for example the port bearing the number 31, and the port connected to a serial/parallel adapter of the internal node, for which this data packet is intended, for example the port bearing the number 20, is occupied by other data packets issuing from other external ports, said data packet is switched to another port connected to a serial/parallel adapter of the internal node, for example the port bearing the number 19, provided however that the association between the ports 19 and 20 was programmed before said switching unit was brought into service.

If this association of ports was not programmed, the data will remain in wait and block the external port 31.

This constitutes a drawback if one of the other communication nodes in the network wishes, during this time, to transmit a data packet at the port 31 of this switching unit.

Likewise, if one of the other communication nodes in the network wishes to transmit a data packet at one of the other ports of this switching unit, for example the port which bears the number 15, and this packet is also intended for the port 20, then the data packet will block the port 15 as long as access to the port 20 is not released.

It should be noted that the data packets transmitted over the network encounter, on their path, different communication nodes each having a switching unit.

The data packets contain so-called identification data which, in particular, identify the different switching units placed on the path of said packets as well as the numbers of the ports, referred to as destination ports, of these switching units through which the packets must emerge in order to join another distant switching unit.

The identification data generally constitute what is referred to as the header of the data packet.

Other data known as user data are placed after the header and are followed by an end of packet mark placed last in said packet.

A switching unit can thus switch data packets coming from a switching unit associated with a network node, referred to as the source node, and received at one of its input/output ports, to another of its input/output ports which supports a point to point connection with another switching unit of a node in this same network, referred to as the destination node.

The switching of the data packet in a switching unit in the network is effected by reading the header of said data packet received at one of its input/output ports and by modifying this header before transferring it, internally, to the destination port.

In ATM networks, where ATM means "Asynchronous Transfer Mode", a table contained in the switching unit changes part of the header by comparing the initial value or values of certain fields in this header with values entered in the table and replaces these initial values with other values which will be read and understood by the network switching units.

Moreover, from the document EP 0 405 990, a network of computers is known which has several communication nodes consisting of computers and at least one switching unit which switches the data packets through said network.

In this switching unit, the ports are all adapted each to support a point to point connection and thus make it possible to transfer data packets from one communication node (a computer) in the network to another node (computer) in the same network.

However, some of these ports are connected to a serial/parallel adapter external to the switching unit which, itself, supports an internal connection to the communication node with which the switching unit is associated.

In this switching unit, when a data packet arrives, its header makes it possible to determine the destination port of the packet.

The packet header contains several bytes of data, one byte being necessary for coding the destination port of each switching unit encountered by the packet.

When the destination point has been identified, the byte which coded this destination port is eliminated and is therefore not transmitted to the following switching unit.

However, the switching method of the aforementioned prior art does not make it possible to adapt effectively to certain cases and notably to the case where the switching units have a sufficiently small number of ports for each port to be able to be coded in a number of bits less than the granularity of the network.

In fact, the granularity of the network being defined as the minimum number of bits recognised by the network, it serves no useful purpose to code each destination port in a number of bits less than the granularity given that the step of eliminating the destination port identification data can be implemented only on a number of bits at least equal to the granularity of the network.

The granularity of the network is for example equal to one byte.

Thus the corresponding bandwidth for a data packet is small.

There is consequently a need to find a new switching method which makes it possible, in particular, to adapt easily to the aforementioned case.

According to a first aspect, the present invention aims to resolve at least one of the above-mentioned problems by proposing a unit for switching data packets associated with a communication node in a network, said switching unit having several input/output ports for the data packets, wherein said switching unit has:

amongst said input/output ports, a number k of ports said to be of a first type and at least one port said to be of a second type which differs from a port of the first type in that it is adapted to support an internal connection to said communication node with which the switching unit is associated, a number n of so-called intermediate ports disposed between the ports of the first and second types, at least one storage means associated with each of said n intermediate ports, means of transferring a data packet between at least one of the ports of the first and second types referred to as the input port and at least one of the ports of the first and second types for which said packet is intended and referred to as the destination port, said transfer means using at least one of the n intermediate ports and said at least one associated storage means.

When a data packet intended for the communication node with which the switching unit is associated is presented at a port of the first type thereof, said packet is transferred to said at least one port of the second type, passing through one of the intermediate ports of said switching unit and said at least one associated storage means.

If, at the moment when this data packet is in the course of transfer between the port of the first type and the intermediate port, a second data packet, also intended for the communication node, is received at another port of the first type of the switching unit, then said switching unit transfers the second packet to a second intermediate port and said at least one storage means which is associated with it.

This makes it possible to receive simultaneously several data packets intended for the communication node.

During this time, the first packet can finish being transferred to said at least one port of the second type and the storage means associated with the second intermediate port stores, at least partially, the second packet received by said second intermediate port.

The storage means associated with the intermediate ports are sized so as to be able to absorb all or part of a data packet should the transfer of a packet take more time than expected.

However, usually, the data packets are received in a fashion which is sufficiently offset in time for the transfer of the first packet to be already well advanced when the second packet presents itself at a port of the first type.

Thus the storage means have in general only part of the data packet to absorb rather than the whole thereof.

The structure with several ports of different types and with several intermediate ports and associated storage means therefore makes it possible to switch several data packets intended for the communication node with which the switching unit is associated and which are received offset in time, or even at the same time, by said switching unit, without blocking the ports of the first type thereof.

This structure therefore makes it possible to reduce the latency in the switching unit and thereby in the network.

Conversely, data packets issuing from the communication nodes with which the switching unit according to the invention is associated and intended for other communication nodes in the network, can be transferred from said at least one port of the second type to ports of the first type.

In this case, the structure with several ports of different types and with several intermediate ports and associated storage means makes it possible to transfer a packet to a first port of the first type, whilst a second data packet is stored at least partially in a storage means before also being transferred to a second port of the first type, thereby avoiding blocking said at least one port of the second type and making the switching unit congested.

Access to the network is thereby improved.

It should be noted that the second port of the first type can be the same as the first port of the first type.

According to a particular characteristic, the switching unit has means of selecting the intermediate ports.

More particularly, these selection means take into account the occupation of the storage means associated with said intermediate ports.

Thus, as soon as a storage means is free, it can be selected and used for storing a data packet therein, at least partially.

According to another particular characteristic, the selection means also take into account a priority level allocated to the intermediate ports.

Thus the priority data packets will be allocated to an intermediate port reserved for this type of data packet.

According to a particular characteristic, the number n is chosen so that said at least one port of the second type is associated with at least two intermediate ports.

According to another particular characteristic, each of said at least two intermediate ports associated with a port of the second type bears the same address as said port of the second type.

Thus the number of bits necessary for coding the address of said at least one internal port is reduced.

In addition, the switching unit has no need to compare addresses of internal ports with each other if it has only one internal port.

Where the switching unit has several ports of the second type, having at least two intermediate ports per port of the second type makes it possible, in spite of everything, to simplify the structure of said switching unit since two intermediate ports bear the same address.

According to another characteristic, the reception means of each intermediate port include at least one storage means.

According to yet another characteristic, the sending means of each intermediate port have at least one storage means.

According to one characteristic, at least one storage means is associated with each of the ports of the first type, which makes it possible to store a data packet therein whilst the switching unit reads the data identifying the port thereof for which said data packet is intended.

Correlatively, the invention relates to a method of switching data packets in a switching unit associated with a communication node in a network and which has several input/output ports for the data packets, said method including the following steps:

receiving a data packet at a port, transferring said data packet to at least one so-called destination port, wherein, amongst the input/output ports, a number k of ports are said to be of a first type and at least one port said to be of a second type and differs from a port of the first type in that it is adapted to support an internal connection to said communication node with which the switching unit is associated, said method including steps of:

selecting a so-called intermediate port amongst a number n of intermediate ports which are disposed between the ports of the first and second types and which have at least one storage means associated with each of them, transferring said data packet via said selected intermediate port and its associated storage means to said at least one destination port.

It should be noted that the switching of data packets using an intermediate port takes place between a port of the first type and said at least one port of the second type or from said at least one port of the second type to itself.

According to a characteristic, said at least one port of the second type is associated with at least two intermediate ports which bear the same address as it.

According to a characteristic, the step of selecting an intermediate port and its associated storage means is performed according to the occupation of the storage means associated with the n intermediate ports.

According to a characteristic, the step of selecting an intermediate port and its associated storage means is performed according to the different priority levels allocated to the n intermediate ports.

According to a characteristic, each intermediate port is associated in a predetermined manner with a port of the first type.

The invention also relates to a data processing apparatus, wherein it has a switching unit as briefly disclosed above.

The data processing apparatus is, for example, chosen among the following: a printer, a server, a computer, a facsimile machine, a scanner, a video tape recorder, a set-top box, a television receiver, a camcorder, a digital camera, a digital photographic apparatus.

According to a second aspect which can be combined with the first aspect, the present invention thus aims at resolving at least one of the above-mentioned problems by proposing a method of switching data packets in a switching unit associated with a communication node in a network, said switching unit having several input/output ports for the data packets, said method including the following steps;

receiving a data packet containing so-called identification data which identify at least one output port of said switching unit and for which said data packet is intended, processing said identification data, transferring said packet to said at least one output port, wherein, amongst the input/output ports, some are said to be of a first type and at least one port is said to be of a second type and differs from a port of the first type in that it is adapted to support an internal connection to said communication node with which the switching unit is associated, said method including the following steps:

determining the type of port for which the data packet is intended, processing the identification data in a different manner according to the type of port determined.

The invention makes provision, instead of routinely deleting the identification data identifying the destination port or ports for the data packet, for effecting a processing of those data which differ depending on whether the destination port or ports are ports of the first or second type.

It should be noted that the processing does not necessarily correspond to a deletion of the data as in the prior art.

This method makes it possible to apply, to the identification data for a data packet which is transferred to a destination port, the most advantageous processing as a function of the type of destination port.

Using this method, it is therefore possible to easily adapt to different cases by choosing the processing of the identification data for a data packet which is appropriate to the destination port for said packet.

Thus, in the aforementioned case where the switching units have a sufficiently small number of ports for each port to be able to be coded in a number of bits less than the granularity of the network, each destination port is coded in the identification data of a packet solely in the necessary number of bits.

The method according to the invention then makes it possible to adapt to this case by carrying out a modification of said identification data for the packet when the latter is destined for a port of the first type and, on the other hand, when the destination port is a port of the second type, then the identification data or the data packets are deleted.

The modification of these data being independent of the number of bits concerned, the granularity of the network is of little importance.

The modification of the data is advantageous in this case since it is no longer necessary to code each port in a larger number of bits than necessary.

The corresponding bandwidth of the data packets in which each destination port is coded solely in the necessary number of bits is thus considerably improved.

In general terms, the step of modifying the data makes it possible for the modified data then to be read and understood by one or more other switching units for which the packet is intended.

The deletion of the identification data solely in the case where the destination port is a port of the second type advantageously simplifies the processing in the communication node since these data are no longer useful for the node and it is not therefore necessary to effect a processing thereof in a processor or a processing unit of said node.

It is also possible to effect these data processings adapted more generally, independently of the number of bits necessary for coding each destination port and the granularity of the network.

It is also possible to envisage on the one hand a deletion of the identification data for a data packet in the case of transfer of said packet to a port of the first type and on the other hand a modification of the identification data in the case of transfer to a port of the second type.

According to one characteristic, the method according to the invention also includes a step of determining said at least one output port for which the data packet is intended.

According to one characteristic, the identification data are in the form of a succession of bits and each of the $2^m$ ports of the switching unit is coded in at least m bits in said identification data, the step of determining said at least one output port for which the data packet is intended consisting of seeking the first m non-nil consecutive bits amongst said identification data.

It should be noted that this coding is independent of the distribution of the ports between ports of the first type and those of the second type.

According to another characteristic, the method according to the invention includes a step of determining the type of switching referred to as broadcast switching or simple unicast switching applied to the data packet under consideration.

Correlatively, the invention relates to a data packet switching unit associated with a communication node in a network, said switching unit having:

several input/output ports for the data packets, means of receiving a data packet including so-called identification data which identify at least one output port of said switching unit and for which said data packet is intended, means of processing said identification data, means of transferring said data packet to said at least one output port, wherein said switching unit has:

amongst said input/output ports, ports said to be of the first type and at least one port said to be of the second type which differs from a port of the first type in that it is adapted to support an internal connection to said communication node with which the switching unit is associated, means of determining the type of port for which the data packet is intended, means of processing the identification data which are adapted to process said data in a different manner according to the type of port determined.

According to one characteristic, the means of processing the identification data in a different manner according to the type of port determined are adapted either to delete said identification data or to modify them.

According to one characteristic, the switching unit has means of determining said at least one output port for which the data packet is intended.

According to a characteristic, the network is in accordance with the standard IEEE 1355.

The invention relates to a communication network, wherein it includes at least one switching unit as briefly disclosed above.

The invention also relates to an information storage means which can be read by a computer or a processor containing programming instructions for a programmable processing device, wherein it enables the programmable processing device to be configured as a switching unit as disclosed above.

The invention also relates to an information storage means which can be read by a computer or a processor containing programming instructions adapted to cause a programmable processing device to operate, wherein it makes it possible to implement a switching method as disclosed above.

The invention relates to a signal containing instructions which can be used by a computer and are adapted to configure a programmable processing device as a switching unit as disclosed above.

The invention relates to a signal containing instructions which can be used by a computer and are adapted to cause a programmable processing device to operate in order to implement a switching method as disclosed above.

The invention further relates to a computer program product loadable into a programmable device, comprising software code portions for performing the steps of the switching method as disclosed above when said product is run on a programmable device.

The advantages and characteristics peculiar to the switching method, to the data processing apparatus having a switching unit, to the communication network including a switching unit, to the information storage means, to the signal and to the computer program product being the same as those disclosed above concerning the switching unit according to the second aspect of the invention, they are not repeated here.

According to a third aspect, the present invention envisages a packet transferring apparatus associated with a communication node in a network that has several types of ports to transfer data packet, said transferring apparatus comprising:

determining means of determining the type of port for which the data packet received from one of said ports is intended, based on identification data of said received data packet; and transferring means of transferring said received data packet to one port of a first type that is linked to the network or, using intermediate means, to one port of a second type that is linked to a communication node according to the results of said determining means.

According to a characteristic, the intermediate means comprises storage means being prepared to handle a plurality of packets data concurrently.

According to a fourth aspect, the present invention also envisages a packet transferring apparatus according in a network that has several types of ports to transfer packet comprising at least identification data representing addresses of the path of the packet through the network, the identification data representing the path of the packet are made by at least a fixed size group of identification data, the transferring apparatus comprising:

determining means of determining the type of port for which the packet received from one port is intended based on a part of the group of identification data;

modifying means of modifying the part of the group of identification data in the packet;

transferring means of transferring the modified packet to one port according to the result of determining means.

According to a fifth aspect, the present invention concerns a packet transferring method in a transferring apparatus associated with a communication node in a network that has several types of ports to transfer data packet, the method comprising the following steps of:

determining the type of port for which the data packet received from one of said ports is intended, based on identification data of said received data packet; and transferring said received packet to one port of a first type that is linked to the network or, using an intermediate unit, to one port of a second type that is linked to a communication node according to the result of said determining step.

According to a characteristic, the intermediate unit comprises a memory.

According to a sixth aspect, the present invention further concerns a packet transferring method associated with a communication node in a network that has several types of ports to transfer packet comprising at least identification data representing addresses of the path of the packet through such network, the identification data representing the path of the packet are made by at least a fixed size group of identification data, the method comprising the following steps of:

determining the type of port for which the packet received from one port is intended based on a part of the group of identification data;

modifying the part of the group of identification data in the packet;

transferring the modified packet to one port according to the result of said determining step.

The invention concerns a memory medium for storing a program to be executed in a packet transferring apparatus associated with a communication node in a network that has several types of ports to transfer data packet, said program comprising:

code for determining the type of port for which the data packet received from one of said ports is intended, based on identification data of said received data packet; and code for transferring said received packet to one port of a first type that is linked to the network or, using an intermediate unit, to one port of a second type that is linked to a communication node according to the result of the determination.

The invention also concerns a memory medium for storing a program to be executed in a packet transferring apparatus associated with a communication node in a network that has several types of ports to transfer packet comprising at least identification data representing addresses of the path of the packet through such network, the identification data representing the path of the packet are made by at least a fixed size group of identification data, the program comprising:

code for determining the type of port for which the packet received form one port is intended based on a part of the group of identification data;

code for modifying the part of the group of identification data in the packet;

code for transferring the modified packet to one port according to the result of the determination.

The invention further concerns a program stored in a memory medium in a packet transferring apparatus associated with a communication node in a network that has several types of ports to transfer data packet, comprising:

code for determining the type of port for which the data packet received from one of said ports is intended, based on identification data of said received data packet; and code for transferring said received packet to one port of a first type that is linked to the network or, using an intermediate unit, to one port of a second type that is linked to a communication node according to the result of the determination.

The invention relates to program stored in a memory medium in a packet transferring apparatus associated with a communication node in a network that has several types of ports to transfer packet comprising at least identification data representing addresses of the path of the packet through such network, the identification data representing the path of the packet are made by at least a fixed size group of identification data, comprising:

code for determining the type of port for which the packet received from one port is intended based on a part of the group of identification data;

code for modifying the part of the group of identification data in the packet;

code for transferring the modified packet to one port according to the result of determination.

The invention relates to packet transferring apparatus associated with a communication node in a network that has several types of ports to transfer data packet, said transferring apparatus comprising:

a processor for determining the type of port for which the data packet received from one of said ports is intended, based on identification data of said received data packet;

and transferring means for transferring said received data packet to one port of a first type that is linked to the network or, using intermediate means, to one port of a second type that is linked to a communication node according to the results of said determining means.

The invention relates to packet transferring apparatus in a network that has several types of ports to transfer packet comprising at least identification data representing addresses of the path of the packet through the network, the identification data representing the path of the packet are made by at least a fixed size group of identification data, the transferring apparatus comprising:

a processor for determining the type of port for which the data packet received from one port is intended based on a part of the group of identification data;

and for modifying the part of the group of identification data in the packet;

transferring means of transferring the modified packet to one port according to the result of determining means.

Other characteristics and advantages of the invention will emerge during the following description given solely by way of illustrative and non-limitative example, made with reference to the accompanying drawings, in which:

FIG. 3b is a schematic view of the logic control unit 30 of FIG. 3a;

FIG. 4 depicts the reception means 41 of the port of the first type 40 depicted in FIG. 3a;

FIG. 6 depicts the reception means 71 of the intermediate port 70 depicted in FIG. 3a;

FIG. 7 depicts the transmission means 76 of the intermediate port 70 of FIG. 3a;

FIG. 8 depicts the management module 120 depicted in FIG. 3a;

FIG. 9a depicts the input/output table 122 of the management module depicted in FIG. 8 at the time of initialisation;

FIGS. 9b, 9c and 9d depict the change in a line in the input/output table 122 for different cases, FIG. 9e depicts the input/output table at the time of initialisation where n=k;

Figures 28A, 28B, 28C:
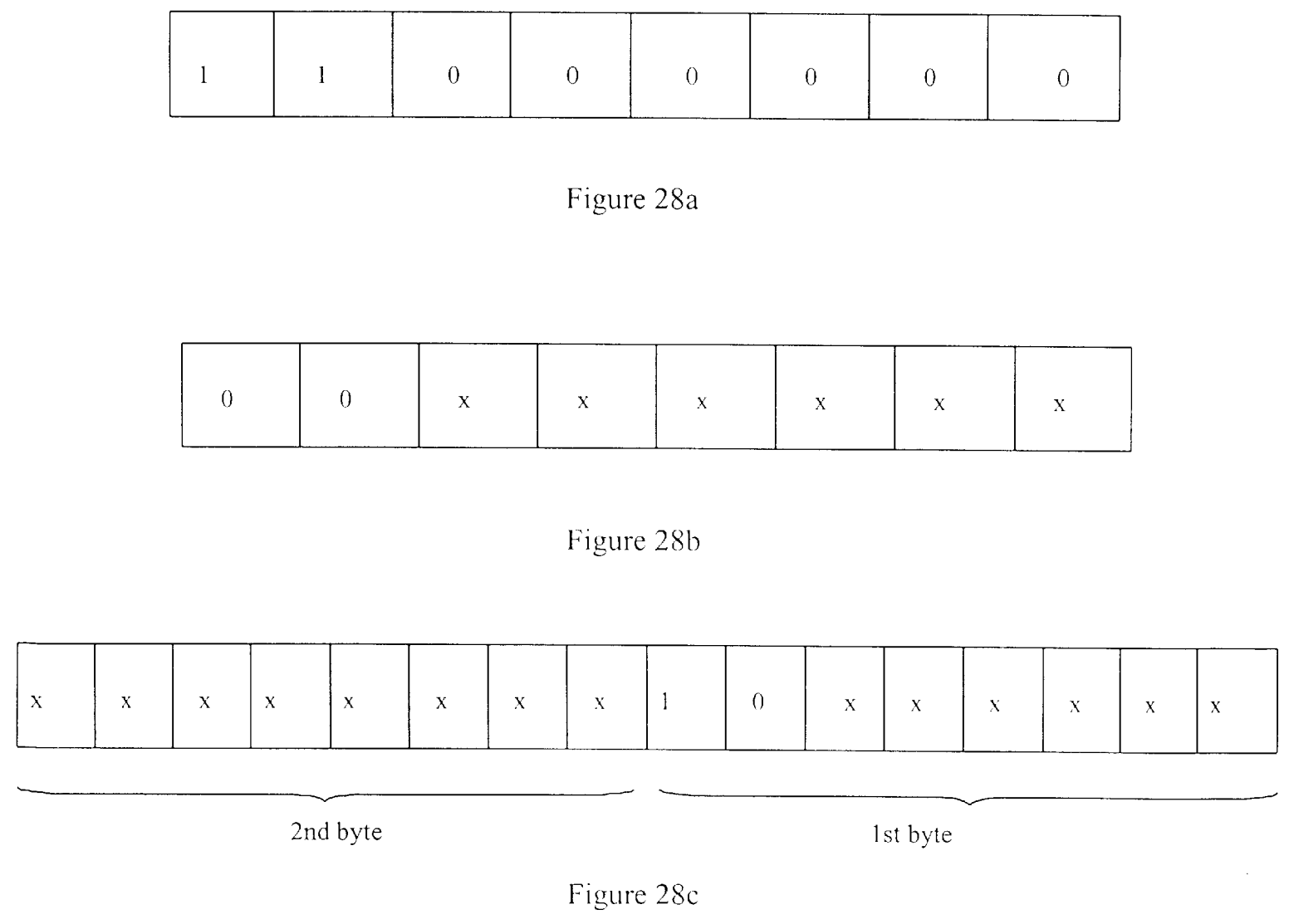
Figure 29:
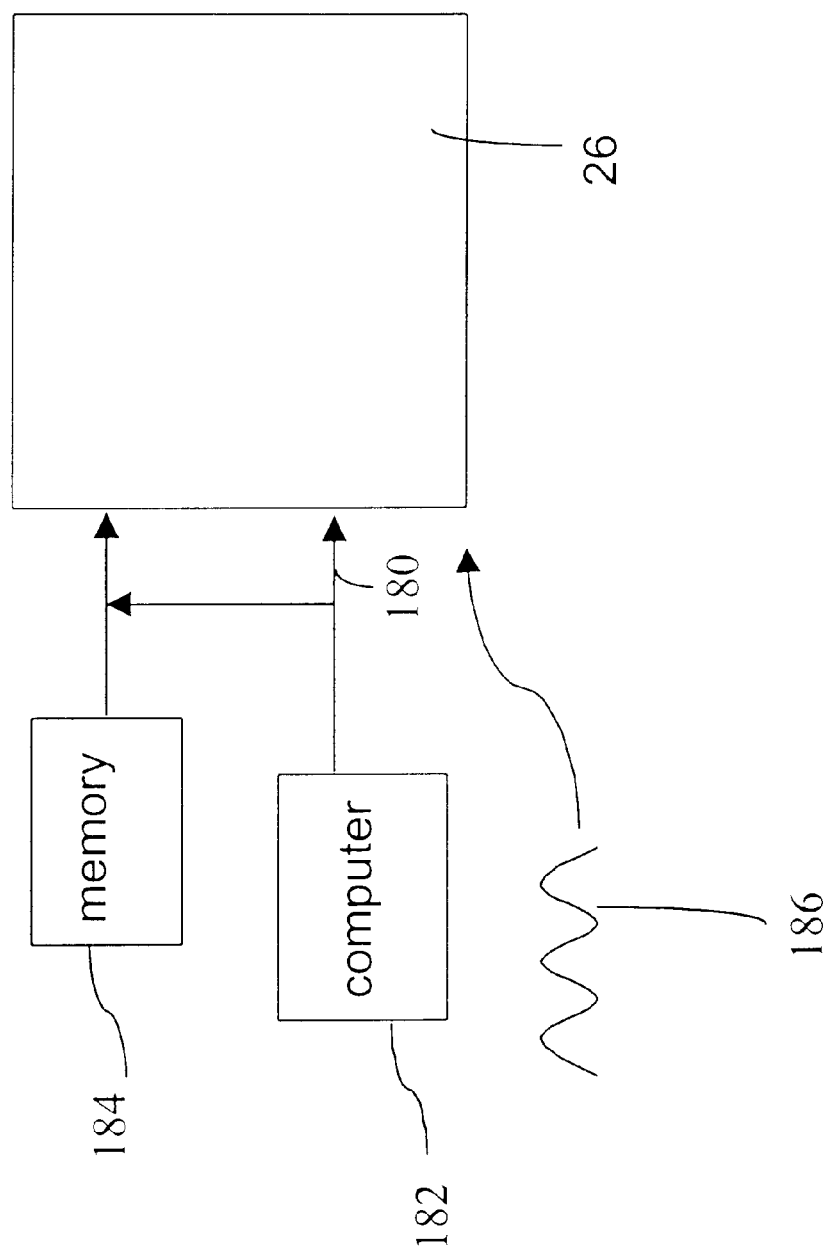

FIGS. 28a, b and c depict different forms of header of a data packet;

FIG. 29 illustrates a mechanism used for programming the switching unit according to the invention.

Figure 1:
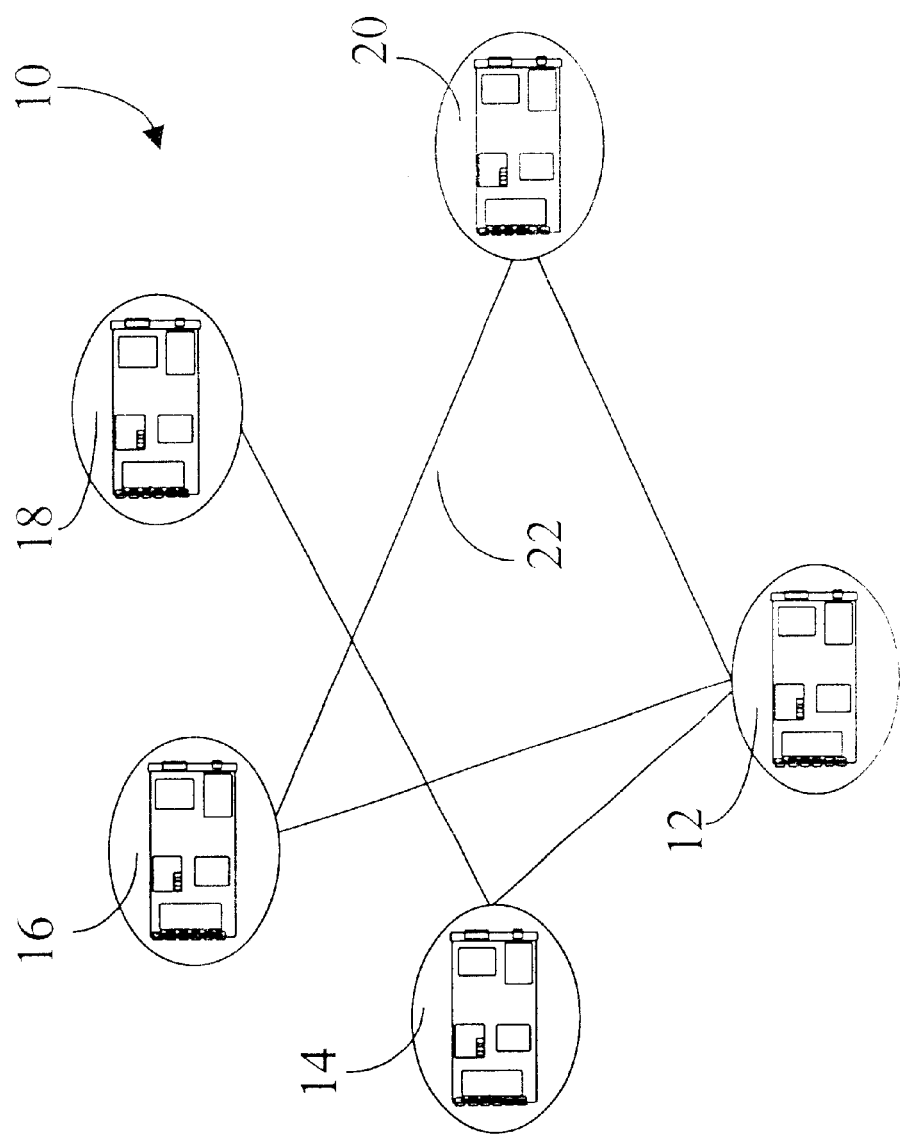
FIG. 1 is a general view of a network according to the invention containing several communication nodes.

As depicted in FIG. 1 and marked by the general reference denoted 10, a packet switching network according to the invention has several switching nodes 12, 14, 16, 18, 20 connected together by the point to point connections marked by the reference denoted 22.

These switching nodes are for example data processing apparatus which can each take the form of a printer, a server, a computer, a facsimile machine, a scanner, a video tape recorder, a decoder known as a "set top box", a television receiver, a camcorder, a digital camera or a digital photographic apparatus.

The nodes are capable of receiving, sending and transmitting data to the other nodes in the network.

Figure 2:
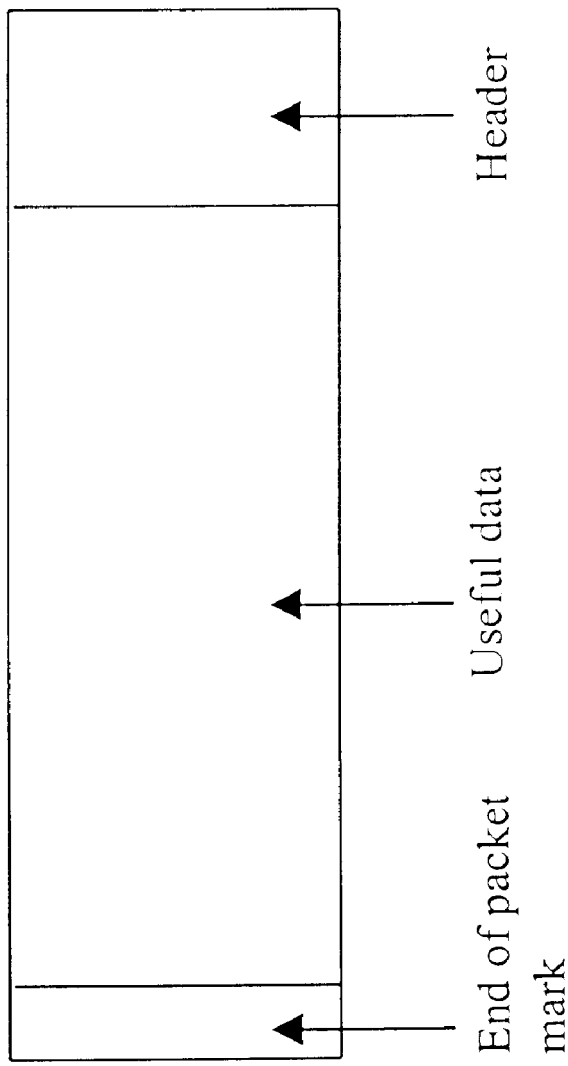
FIG. 2 is a schematic view of the structure of a data packet.

In such a network the data are conveyed over connections 22 in the form of packets depicted schematically in FIG. 2 and consisting of useful data, identification data forming the packet header and indicating notably the destination of said packet and the path taken by it through the network, and an end of packet mark.

It should be noted that the packet identification data indicating notably the destination of said packet and the path taken by it through the network are not necessarily placed in the header, but can, on the contrary, be placed at another point such as, for example, at the end of the packet.

Several data packets form a message and the last packet of the message carries an end of message mark rather than an end of packet mark.

The switched network implements for example IEEE 1355, and the aforementioned data comply with the communication protocol defined by this standard. This standard enables the network to benefit from a reliable protocol using routing at source, flow control at the links and packets of variable size.

Figure 3A:
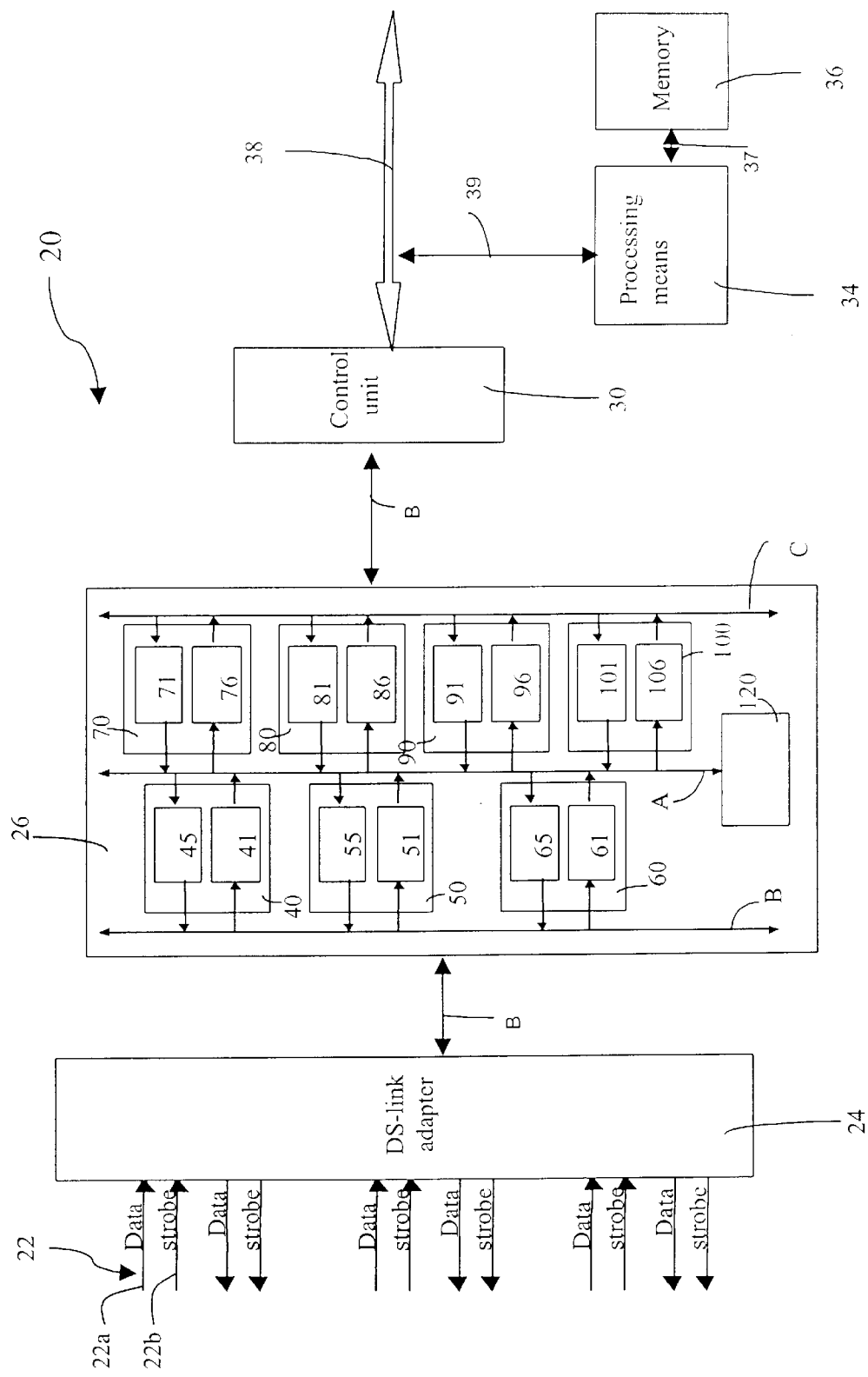
FIG. 3a is a schematic view of a communication node consisting of the data processing apparatus 20 of FIG. 1 according to a first embodiment of the invention.

As depicted in FIG. 3a, the data processing apparatus 20 of FIG. 1, which is for example a digital photographic apparatus, has an element referenced 24 which effects the interface between a switching unit 26 and the network and which is referred to as a network adapter.

Such an element is for example sold by the company Four Links for Technical Help under the reference C112.

In this figure the connections 22 are represented by two buses: one denoted "data" and referenced 22a and the other denoted "strobe" and referenced 22b. This coding, referred to as "data-strobe", is described in the document EP 0 458 648.

As depicted in FIG. 3a, the switching unit 26, according to a first embodiment of the invention, is connected to the network adapter 24 by means of a bus B.

The data processing apparatus constituting the node 20 and which is depicted in FIG. 3a has a logic control unit denoted 30 which is connected to the switching unit 26 by means of a bus C, which will be referred to again below.

Figure 3B:
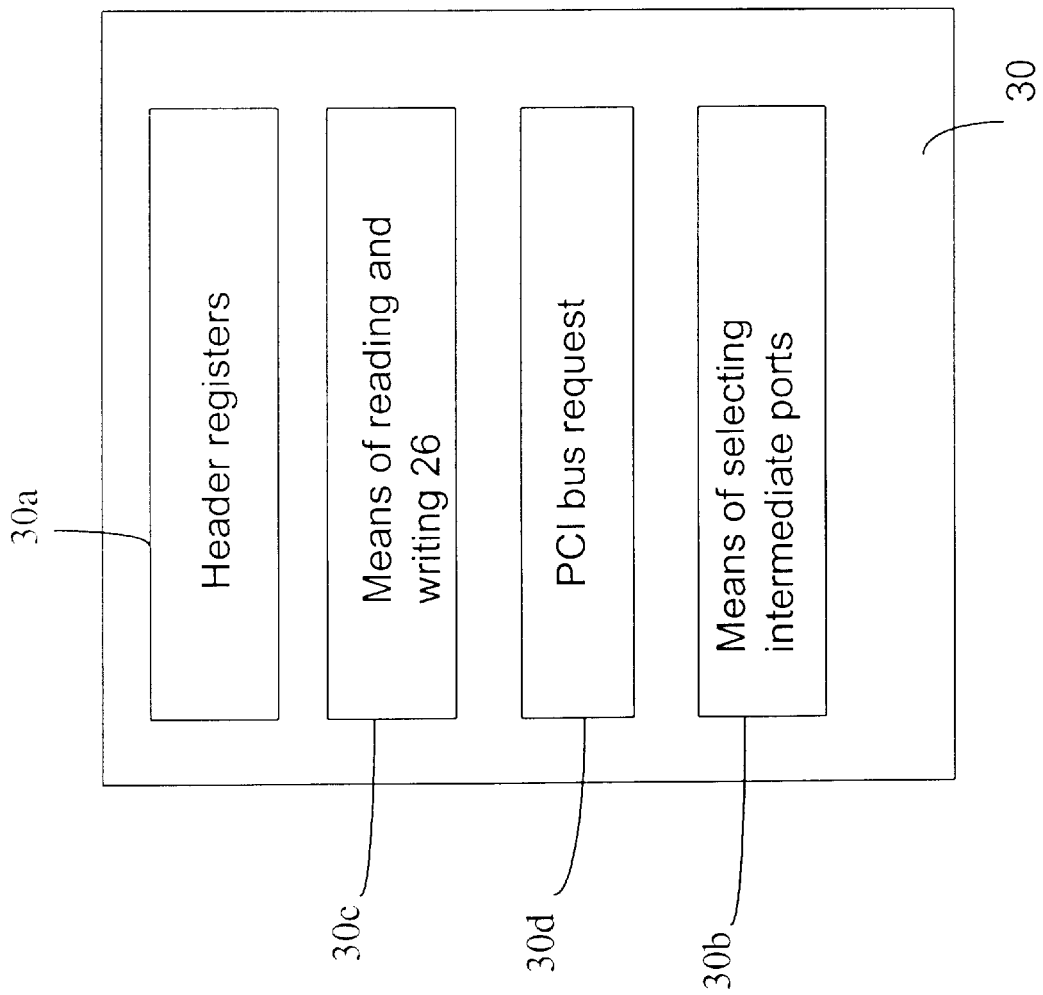

As depicted in more detail in FIG. 3b, the logic control unit 30 contains a header register block 30a, a selection block 30b, a means 30c of reading and writing data in the switching unit 26 and a PCI bus request block 30d.

The data processing apparatus 20 also has a data processing unit 34, for example a processor, and a memory 36, connected together by means of a bus 37.

The logic control unit 30 is connected to the data processing unit 34 by means of a bus, for example of the PCI type, denoted 38, and a bus 39.

As depicted in FIG. 3a, the switching unit 26 has a number k of ports of a first type with k=3 in this example. A port of a first type is defined by the fact that it is adapted to exchange data packets with the network, either directly by means of a point to point connection 22, or indirectly by means of a point to point connection and a network adapter 24. These ports are also referred to as external ports and are represented in FIG. 3a by blocks referenced 40, 50 and 60.

It should be noted that the network adapter 24 converts the data packets coming from the network in a serial format into a parallel format and that the ports of the first type convey data packets in parallel form.

However, the invention also applies to switching units whose ports of the first type convey data serially, as described in the document EP 0 405 990.

The switching unit 26 also has a number n of ports referred to as intermediate ports. These intermediate ports are four in number in the example depicted in FIG. 3 and are indicated by the blocks referenced 70, 80, 90 and 100.

Each port of the first type has on the one hand means of receiving and sending a data packet which has been transmitted by the point to point connection 22 associated with said ports of the first type and which is intended either for a port of the first type or for a port of the second type and, in addition, means of sending a data packet intended for the point to point connection 22 associated with this same port. It should be noted that the data packets received or sent over a point to point connection 22 are respectively transmitted by means of the network adapter 24 and bus B.

As depicted in FIG. 3a, the receiving and sending means of the ports of the first type denoted 40, 50, 60 are respectively referenced 41, 51, 61.

The sending means of these ports of the first type denoted 40, 50 and 60 are for their part referenced respectively 45, 55, 65.

Figure 4:
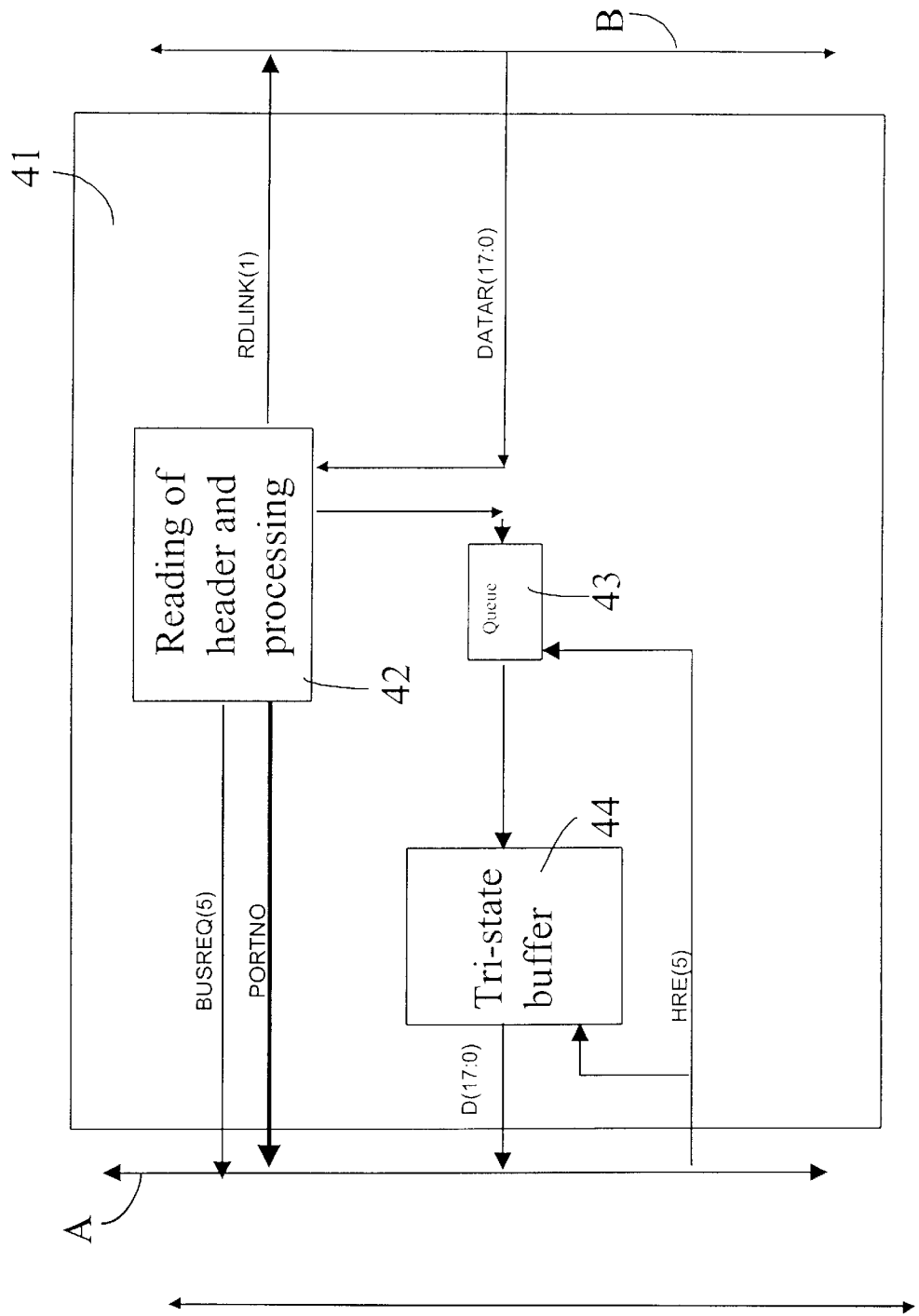

The receiving and sending means 41 of the port of the first type 40 are depicted in more detail in FIG. 4.

Thus these receiving and sending means 41 include means 42 of reading and processing identification data corresponding to the header of a data packet as depicted in FIG. 2. These identification data serve to identify the port of the switching unit for which this data packet is intended. It should be noted that these identification data are not necessarily placed in the header of the packet but can be placed at another place therein, such as for example at the end of the packet. In such a case, it is of course necessary to provide storage means associated with the ports of the first type in order to receive therein the entire data packet.

The identification data processing means are adapted, according to the circumstances, either to eliminate said data, or to modify these data according to the nature of the destination port. This point will be returned to subsequently in more detail.

The receiving and sending means 41 also include a queue denoted 43, which corresponds in fact to a storage means of small size and can for example take the form of a "FIFO" or "first in, first out" memory. This queue denoted 43 has the storage capacity of a word or a double word and its function is to store the header modified before the transfer to the destination port.

The queue 43 is on the one hand connected to the reading and processing means 42 and on the other hand to a tri-state buffer 43. This tri-state buffer enables the output of the queue 43 to be put at high impedance so that the data issuing from said buffer do not interfere with the data on the bus to which the receiving and sending means 41 are connected. This bus is depicted by the letter A in FIGS. 3 and 4.

The means 42 of reading and processing the identification data in FIG. 4 are connected to the communication bus denoted B, which can also be seen in FIG. 3a. This communication bus B serves the three ports of the first type 40, 50 and 60.

Figure 5A:
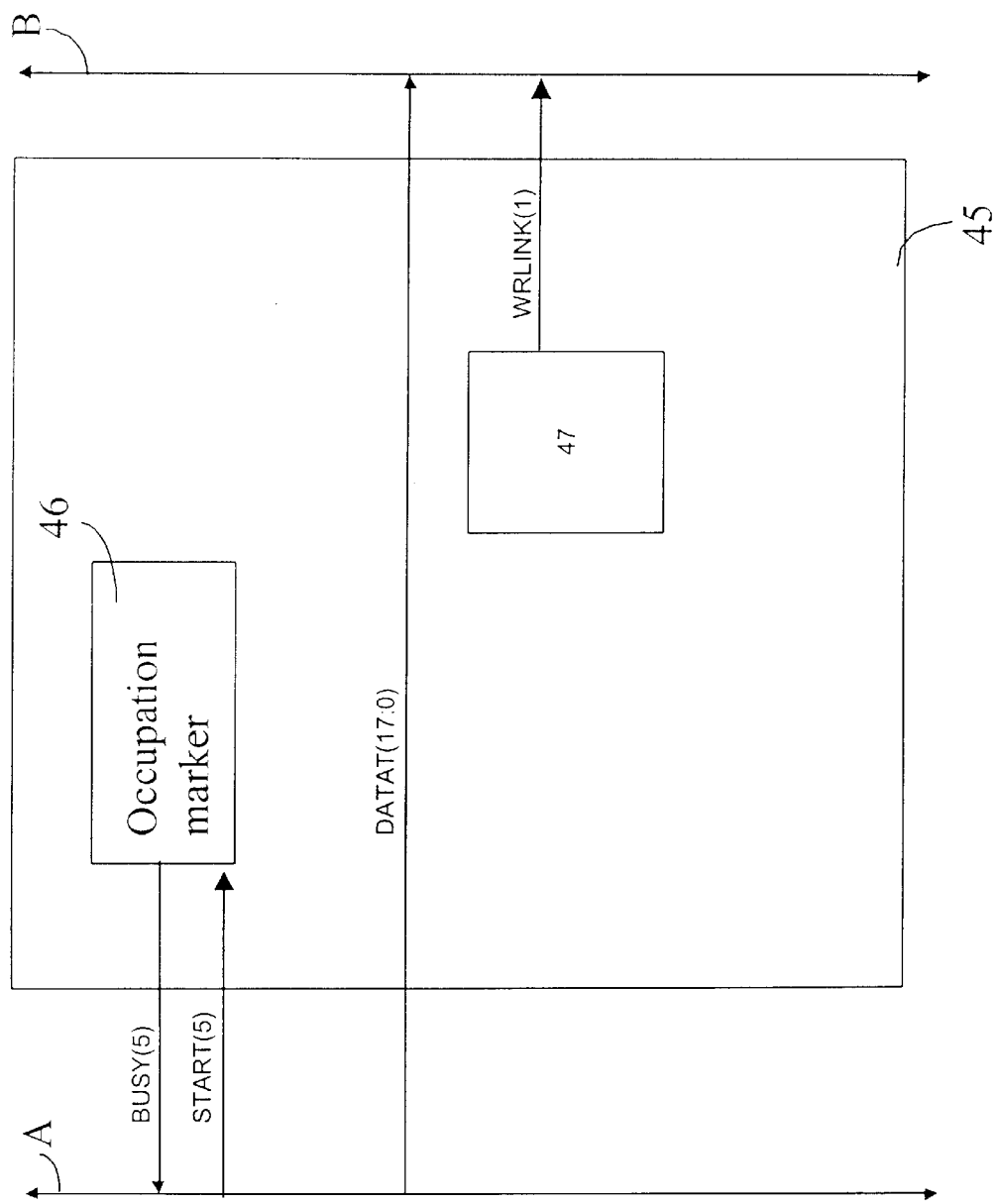
FIG. 5a depicts the transmission means 45 of the port of the first type 40.

FIG. 5a depicts in more detail the sending means 45 of the port of the first type 40 in FIG. 3a. This figure depicts an occupation marker denoted 46 which communicates with the internal communication bus denoted A, and a data flow control unit denoted 47 which is put in communication with the communication bus denoted B.

The function of the occupation marker 46 is to indicate to other elements of the switching unit 26 that the sending means 45 are in the process of sending a data packet, and that they are therefore not available for other tasks. The function of the data flow control unit 47 is to control the sending of data over the bus B, that is to say to allow them to be sent only if the network adapter is available to receive them. For example, if this adapter has storage means and these storage means are not full, then the sending of the data can be enabled by the unit 47.

The switching unit 26 has means of transferring the data packet between the ports of the first type and the intermediate ports.

These transfer means have a bus-type architecture, depicted in the figures by the communication bus denoted A.

It should be noted here that, in an architecture of the bus type, all the ports of the first type and intermediate ports are connected together by a single bus, the bus A, and therefore only one communication can take place at a given time t.

It should be noted that the speed of the communication bus A can be optimised so as to permit rapid transfer of the data, thereby avoiding unwanted waiting time between the moment when the packets are received by ports of the first type and the moments when these packets are transferred to the intermediate ports, destined for the internal node.

More precisely, when data packets are received simultaneously by ports of the first type at a certain frequency, the operating frequency of the internal bus A can be such that it allows the transfer of data from all the ports of the first type to intermediate ports by interleaving said data over time, so as to process only one packet at a time.

For this it is necessary for the operating frequency of the bus to be appreciably greater than that of the links 22.

The data flow entering the switching unit 26 is therefore easily absorbed.

Figure 5B:
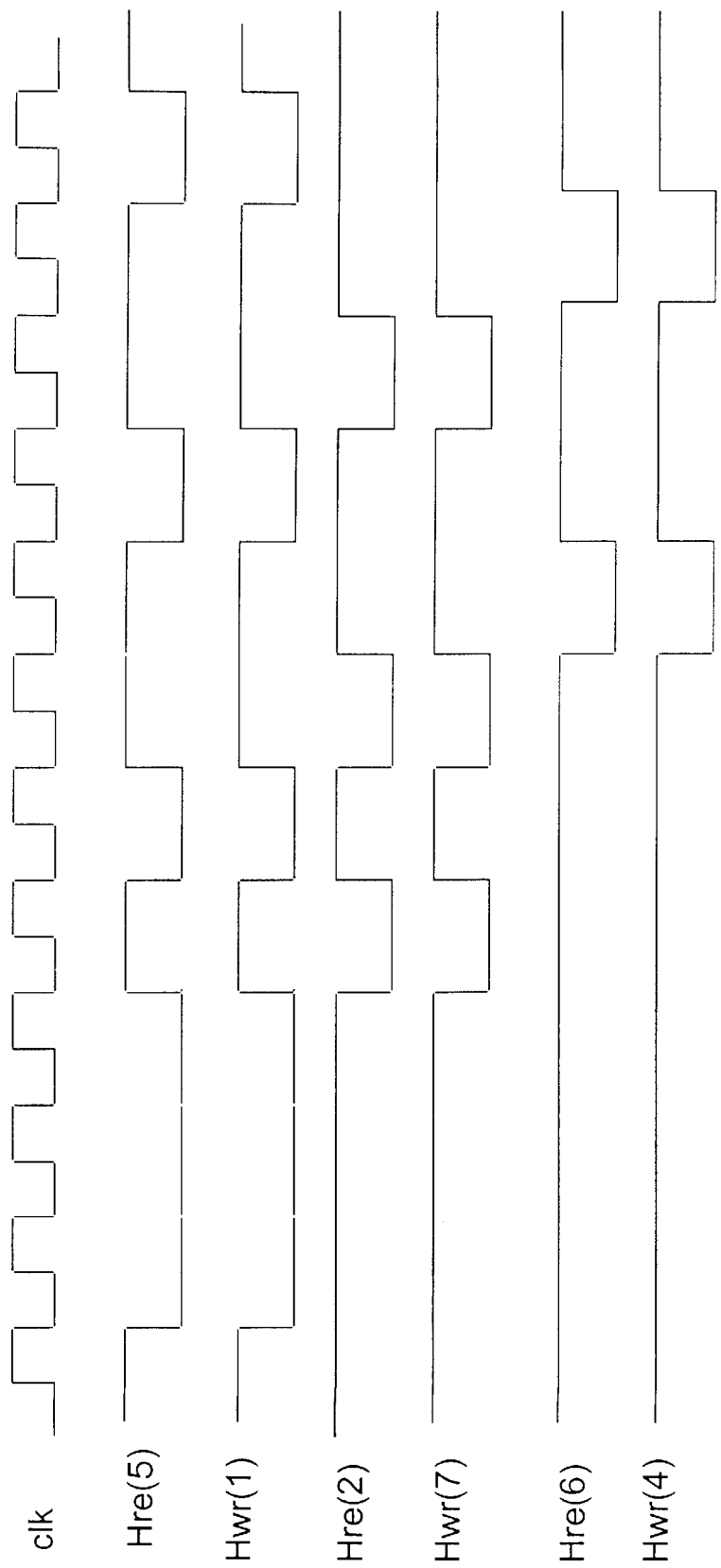
FIG. 5b illustrates the phenomenon of multiplexing of data coming from different ports of the switching unit 26.

FIG. 5b depicts the timing diagrams of different signals Clk, Hre and Hwr.

The signals Hre and Hwr are depicted in FIGS. 4, 6, 7 and 8.

The figures between parentheses indicate the number of the port concerned, the numbers having been allocated from 1 to 7 respectively for the ports 70, 80, 90, 100, 40, 50 and 60.

Returning to FIG. 5b, the signal Clk is a clock signal, the signals Hre (5) and Hwr (1) represent the data reading signals in the port 5, that is to say the port of the first type 40, and of writing in the intermediate port 1, that is to say the port of the first type 70.

The signals Hre (2) and Hwr (7) for their part are applied to the transfer of data from the intermediate port 80 to the external port 60.

The signals Hwr (6) and Hwr (4) concern the transfer of data from the port of the first type 50 to the intermediate port 100.

These timing diagrams illustrate the fact that the bus-type architecture of the switching unit enables the data to be multiplexed within them by interleaving them rather than transferring a single data packet at a time.

Returning to FIG. 3a, each intermediate port 70, 80, 90, 100 has on the one hand means of receiving and sending a data packet coming from the node itself and intended either for a port of the first type or a port of the second type denoted C, which will be described later, and on the other hand means of receiving and sending a data packet coming from a port of the first type and intending for the port of the second type.

The means of receiving and sending a data packet coming from the port of the second type are respectively referenced 71, 81, 91 and 101 in FIG. 3a. The means of receiving and sending a data packet coming from a port of the first type are respectively referenced 76, 86, 96 and 106.

Figure 6:
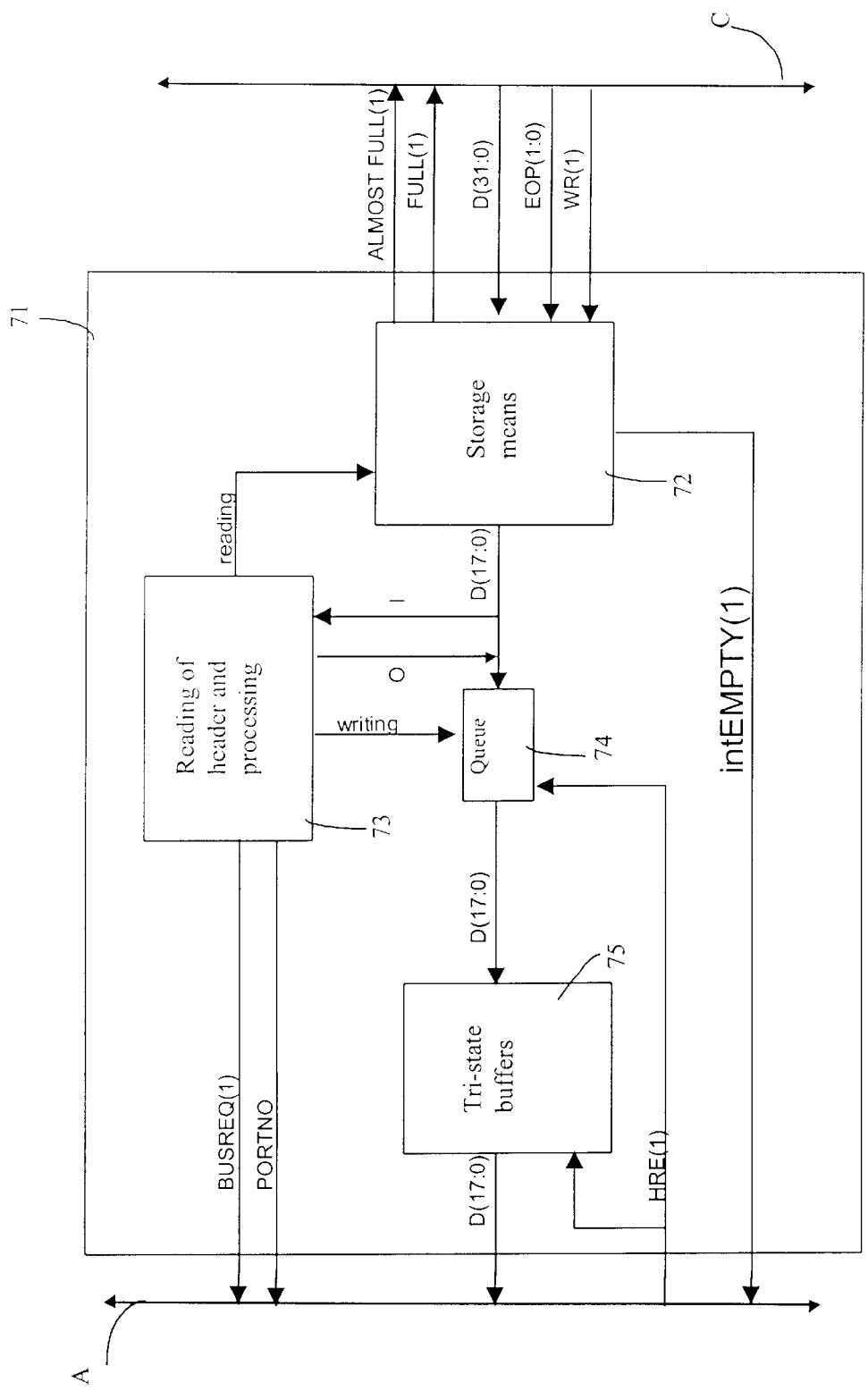

FIG. 6 depicts in more detail the receiving and sending means 71 of the intermediate port 70 of FIG. 3a.

These means 71 include means 73 of reading and means of processing identification data identifying the destination port of the data packet under consideration.

In a similar fashion to that which was described with reference to FIG. 4 for a port of the first type, the receiving and sending means 71 have a queue 74 and a tri-state buffer 75. The queue 74 is in communication with on the one hand the reading and processing means 73 and on the other hand the buffer 75 which communicates data over the communication bus A.

The functions of the elements 74 and 75 are the same as those of the elements 43 and 44 of FIG. 4.

In addition, the receiving means 71 also include a storage means 72 which is for example of the "FIFO" type, that is to say of the "first in first out" type. The storage means 72 is of a size which enables it to store an entire data packet if required. For example, the size of the storage means is 32 bytes.

The storage means 72 of FIG. 6 is in communication with the reading and processing means 73, and with the queue 74.

This storage means also communicates with a communication bus denoted C and depicted on the right-hand side of FIG. 6 and in FIG. 3a.

Figure 7:
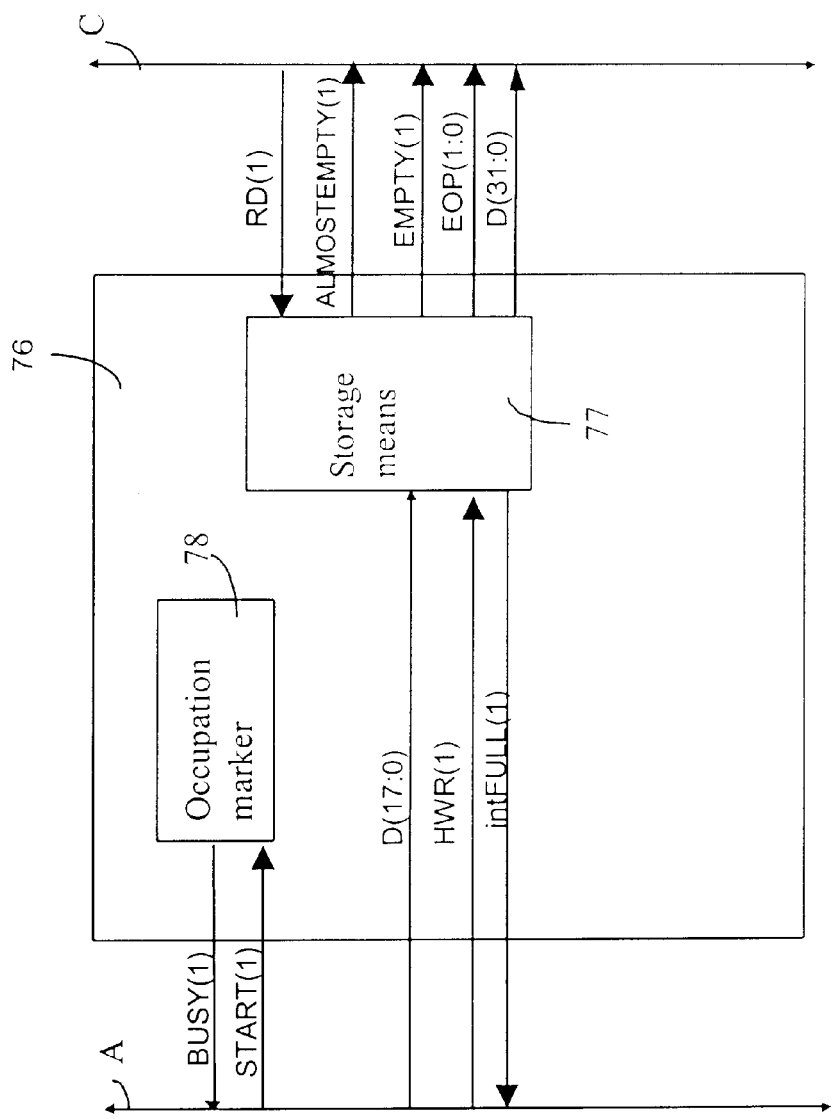

FIG. 7 depicts in more detail the receiving and sending means of the intermediate port 70 of FIG. 3a.

The receiving and sending means 76 include a storage means 77 which is for example of the "FIFO" type and similar to that depicted in FIG. 6 by the reference 72. The size of this storage means also enables it to store, if necessary, an entire data packet.

This storage means 77 is in communication with the communication bus denoted C and with the internal communication bus A.

These receiving and sending means 76 also have an occupation marker 78 which is in communication with the communication bus denoted A.

The function of the occupation marker 78 is to indicate to the different elements of the switching unit 26 that the receiving and sending means 76 are in the process of sending a data packet and therefore are temporarily unavailable for sending another data packet.

As depicted in FIG. 3a and mentioned above, the switching unit 26 also has at least one port of the second type, also referred to as an internal port. Such a port is defined by the fact that it is adapted to support an internal connection to the communication node 20 with which the switching unit 26 is associated.

As depicted in this figure, the switching unit has a single port of a second type which is denoted C in this figure. In the example embodiment depicted in FIG. 3a, the four intermediate ports 70, 80, 90 and 100 are associated with a single port of the second type and bear the same address as this port.

This advantageously makes it possible not to have to code, in the header of the data packets, the number of these intermediate ports.

The result is thus a saving in bandwidth at the switching unit.

Seen from the outside, the switching unit 26 does not have intermediate ports and only the numbers of the ports of the first type and of the port of the second type are to be coded in the header of a data packet.

The port of the second type denoted C is a communication bus formed by a set of signals including notably a bidirectional parallel data communication bus.

The port of the second type C connects the intermediate ports 70, 80, 90, 100 to the logic control unit 30.

Thus the port of the second type C conveys data in parallel form, which has the advantage of being able to dialogue easily with the data processing unit 34.

It should be noted that it would also have been possible to provide two ports of the second type which would each have been connected to two intermediate ports. This case would have the advantage of being able to connect, for example, two separate buses to the switch and therefore to achieve for example two processors or two processing means.

In general terms, it is also possible to increase the number of ports of the first type and of the second type but, in this case, it is also necessary to increase accordingly the number n of intermediate ports in a proportion of at least two intermediate ports for one port of the second type, notably in order to avoid congestion problems within the switching unit 26.

It should be noted that the intermediate ports are arranged between the ports of the first type and the port of the second type.

In the example embodiment depicted in FIG. 3a, the number n of intermediate ports is strictly greater than the number k of ports of the first type. This has the advantage of being able to transfer a data packet received at one of the ports of the first type to an intermediate port whilst the other three intermediate ports are occupied by three packets received previously.

Thus the ports of the first type are rapidly available for receiving other data packets.

It must be emphasised that the ports of the first type 40, 50 and 60 and the port of the second type operate in duplex bidirectional mode, that is to say they can transmit data packets simultaneously and in both directions.

As depicted in FIG. 3a, the switching unit 26 also has a module 120 for managing switching of data packets which is connected to the communication bus denoted A.

Figure 8:
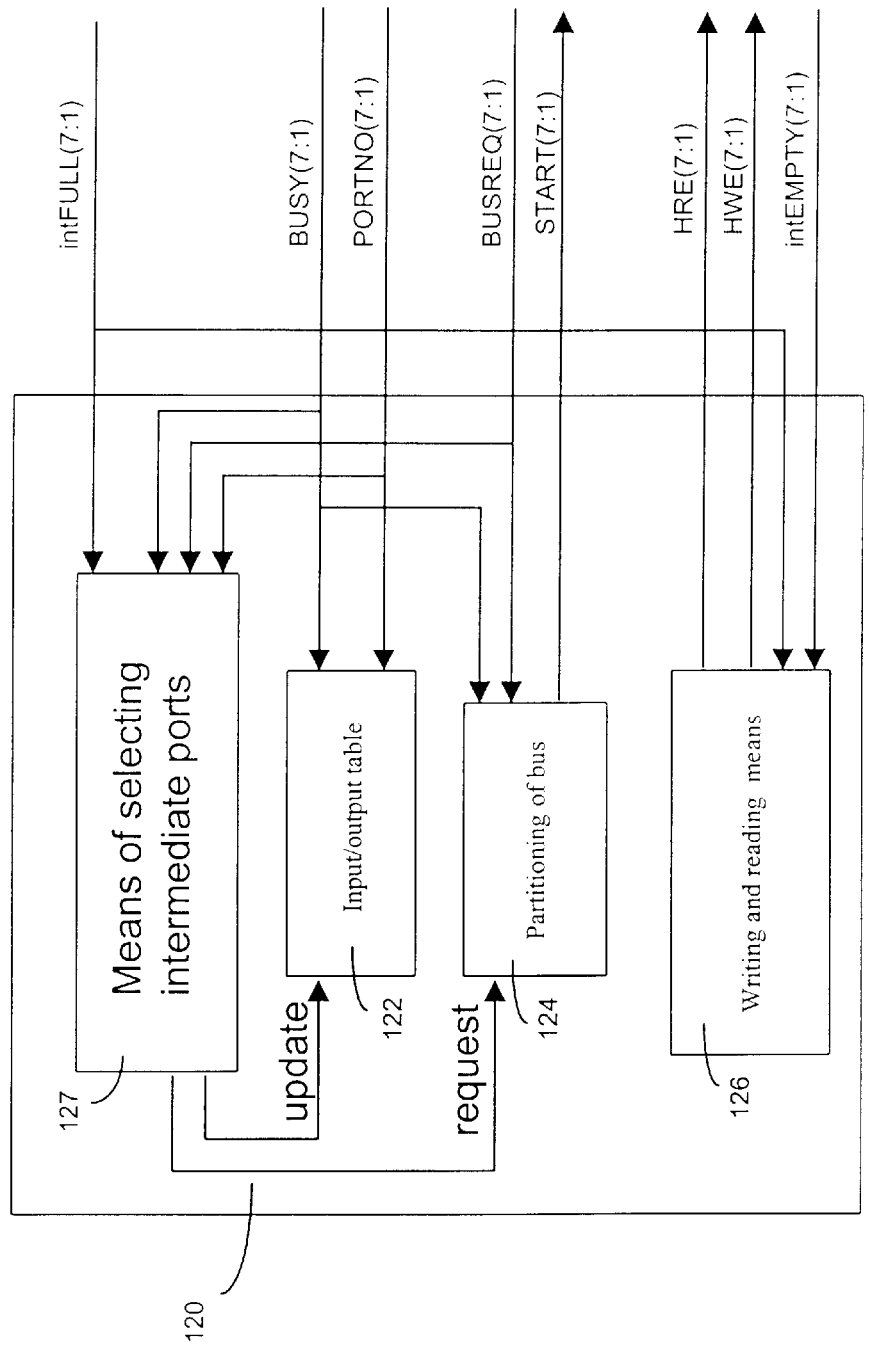

The management module 120 is depicted in more detail in FIG. 8.

Thus, in this figure, the management module has an input/output table 122, a unit for partitioning the communication bus A, a writing and reading means denoted 126 and a unit for selecting the intermediate ports 127.

FIG. 9a depicts the input/output table 122 of FIG. 8 on initialisation. This table establishes a match between the number of the port at which a data packet arrives in the switching unit 26 and the number of the port for which said packet is intended. On initialisation, no output port is allocated to the different input ports represented by the ports 40, 50, 60, 70, 80, 90 and 100.

However, where a data packet is transferred from a port of the first type to a port of a second type, the destination port indicated in this table corresponds to the intermediate port through which the packet will pass before joining the port of the second type.

This table gives, at a given moment, the switchings which have been performed in the switching unit 26. Thus, as depicted in FIG. 9b, the port of the first type 40 is switched to the port of the first type 50, the other input ports not having any output port allocated.

Later in the description more details will be given about the use of this table and the functions of the various other units of the management module 120.

Figure 10:
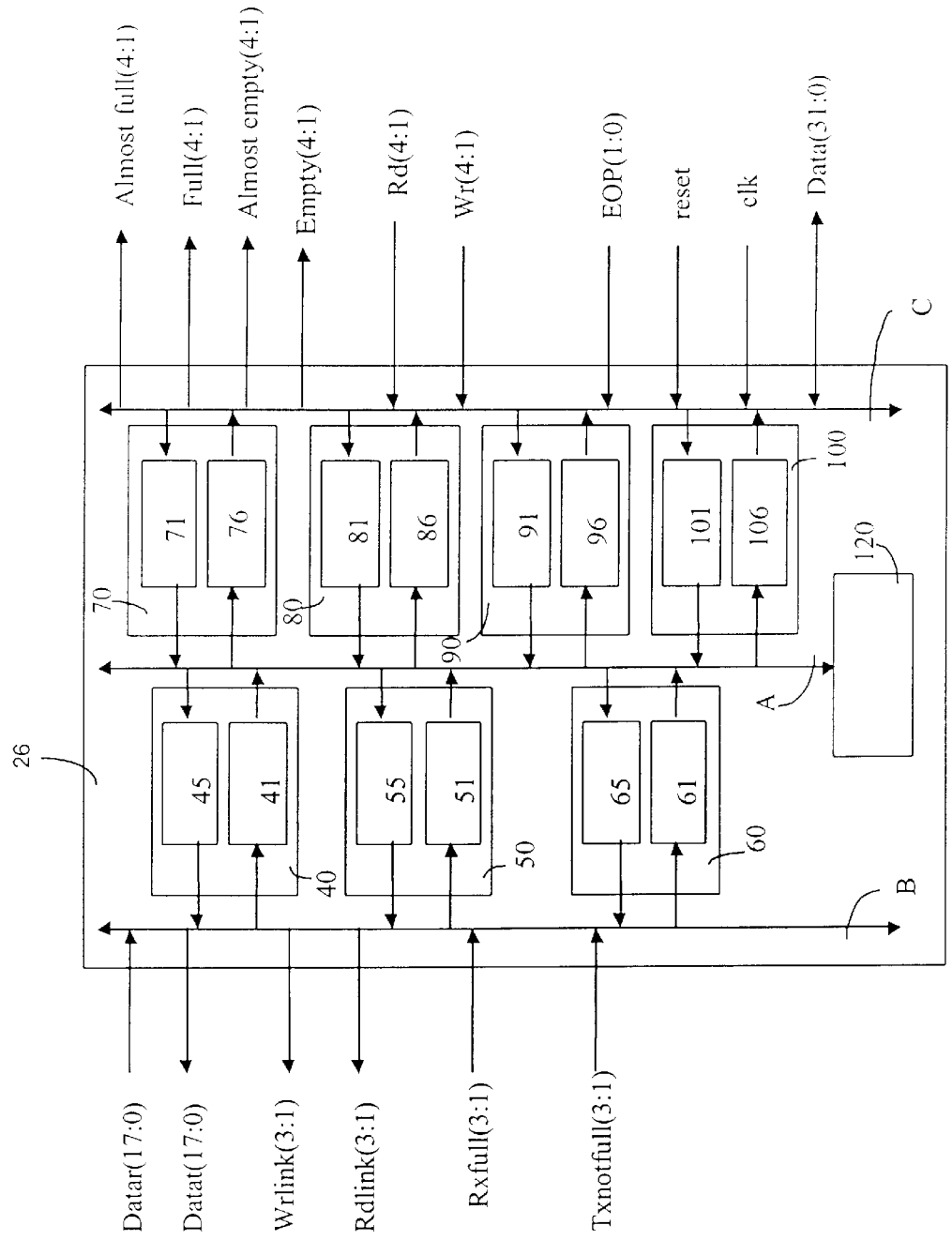
FIG. 10 depicts the switching unit 26 of FIG. 3a according to a first embodiment of the invention with different interface signals.

FIG. 10 depicts a view of the switching unit 26 of FIG. 2a without the elements surrounding it. This figure indicates the different interface signals on the one hand between the switching unit 26 and the network adapter 24 and which are conveyed by the bus 4, and on the other hand between the switching unit 26 and the inside of the data processing apparatus or node 20 and which are conveyed by the port of the second type or bus C.

Thus the interface signals conveyed by the communication bus denoted B are defined as follows:

The signal Datar(17:0) is a signal representing data received by the bus coming from the bus denoted B in FIG. 3a. These data are coded in 18 bits.

Figure 11:
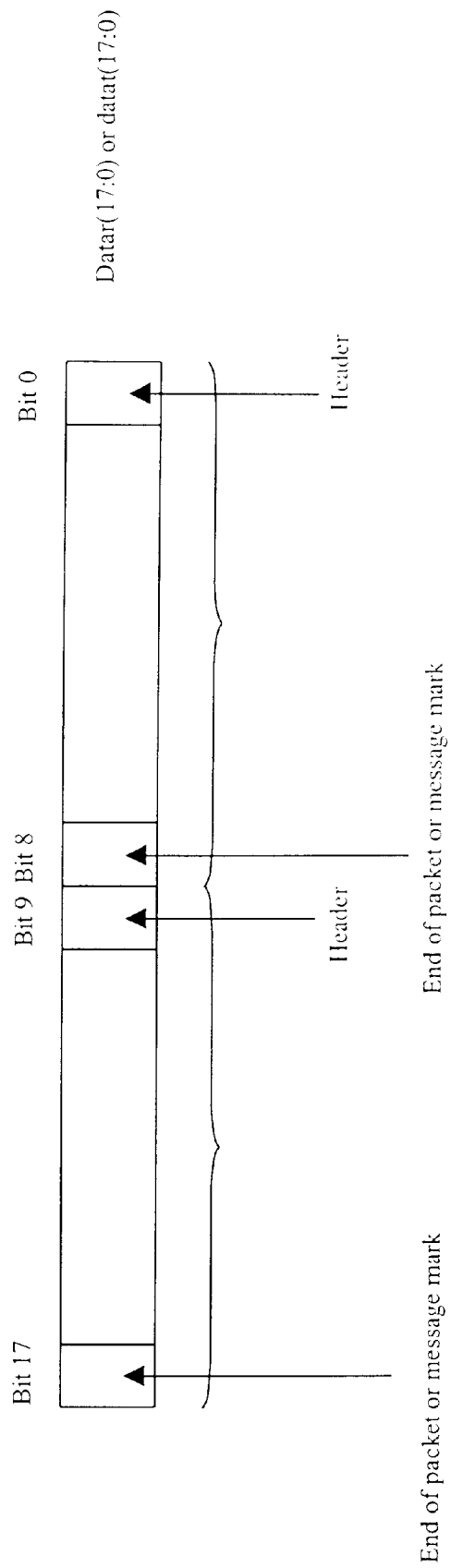
FIG. 11 depicts the structure of a signal Datar(17:0) or Datat(17:0)

The signal Datat(17:0) is a signal representing the data sent by one of the ports of the first type 40, 50 and 60. It should be noted that FIG. 11 shows the structure of the Datar(17:0) or Datat(17:0) data. In this figure, the 18 bits are decomposed into two distinct bytes each formed by 9 bits, bits 0 to 8 and then bits 9 to 17. This is due to the fact that the data are coded in the form of bytes on the links 22. Bit 0 or bit 9 represent the first bit transmitted in the byte and bit 8 or bit 17 code the end of packet mark or end of message mark in association with bit 0 or bit 1.

The signal WrLink(3:1) is a single for writing the data sent by one of the ports of the first type over the point to point connection 22. This signal, as will be seen later, is active at the low state.

The signal RdLink(3:1) is a signal for reading the data coming from the point to point connection 22 and which are received by one of the ports of the first type. As will be seen later, this signal is active at the low state.

FIG. 10 also depicts the interface signals between the switching unit 26 and the inside of the data processing apparatus or node with which said switching unit is associated. These interface signals are conveyed by the port of the second type or bus C and which is connected to the different intermediate ports 70, 80, 90, 100.

The interface signals are defined as follows:

The signal AlmostFull(4:1) comes, as depicted in FIG. 6, from the storage means 72 and indicates that said storage means is almost full. This signal, active at the low state, is equal to 0 when the capacity of the storage means is equal to the maximum capacity thereof minus two double words.

The signal Full(4:1), as depicted in FIG. 6, comes from the storage means 72 and indicates that said means is full. This signal, active at the low state, is equal to 0 when the storage means 72 of the receiving means 71 depicted in FIG. 6 is full.

The signal AlmostEmpty(4:1), as depicted in FIG. 7, comes from the storage means 77 of the receiving and sending means 76 of the intermediate port 70. This signal indicates the moment when the storage means 77 is almost full. This signal, active at the low state, is equal to 0 when the storage means 77 contains no more than two double words.

The signal Empty(4:1), as depicted in FIG. 7, comes from the storage means 77. This signal, active at the low state, is equal to 0 when the storage means 77 is empty.

The signal Rd(4:1) is a signal for reading the storage means 77, as depicted in FIG. 7. This signal is active at the low state.

The signal Wr(4:1) is a signal for writing in the storage means 72 depicted in FIG. 6. This signal is also active at the low state.

The signal Br(3:1) indicates the numbers of the ports of the first type for which the broadcast data packet coming from within the node is intended. This signal, active at the low state, indicates to the switching unit 26 to which port of the first type the broadcast packets must be sent. For example, when the signal Br(3:1) is equal to "010", then the broadcast packets will be sent to the ports 40 and 60 of the switching unit.

The signal EOP(1:0) is, as depicted in FIGS. 6 and 7, a signal respectively ending up at the storage means (72) and coming from the storage means 77. This signal makes it possible to detect an end of packet or end message mark either when a data packet is received by an intermediate port or when this packet is sent by said intermediate port. Thus, for example, when the signal EOP(0:1) is equal to "00", this means that said signal is not used, when the signal EOP(1:0) is equal to "01" this means that an end of message is concerned. When the signal EOP(1:0) is equal to "10", it is a case of an end of packet, and when the signal EOP(1:0) is equal to "11", this means the signal is not valid.

The signal Reset or reset to zero signal is active at the low state.

The signal Clk is a signal coming from the clock of the node in question, but which is not depicted in the figures. This signal serves to sequence the operations performed in the switching unit 26. It should be noted that the frequency of the clock is for example equal to 33 MHz.

The signal Data(31:0), as depicted in FIGS. 6 and 7, is a signal which respectively ends up at the storage means 72 and comes from the storage means 77, depending on whether the data are entering the switching unit or leaving it. This signal contains 32 bits.

The different signals conveyed by the internal bus denoted A of the switching unit 26 are as follows:

The signal D(17:0), as depicted in FIGS. 6 and 7, represents either of the data which are transmitted over the communication bus A by the receiving and sending means 71 of the intermediate port 70, or which are received from said communication bus A by the receiving and sending means 76 of the intermediate port 70. As mentioned above, the data transmitted by the receiving and sending means 71 of the intermediate port 70 over the internal communication bus A are transmitted by means of the buffer 75 depicted in FIG. 6. The data which for their part are received from the internal communication bus A by the receiving and sending means 76 of the intermediate port 70 are more particularly received in the storage means denoted 77 in FIG. 7. The data of the signal D(17:0) are coded in 18 bits.

The signal Busy(7:1) is a signal representing the occupation of the ports of the first type and the intermediate ports. As depicted in FIGS. 5 and 7, this signal Busy (7:1) is respectively generated by the occupation markers 46 and 78 of the ports 40 and 70 of these figures. As depicted in FIG. 8, the signal Busy(7:1) generated by the occupation markers for the intermediate ports and the ports of the first type is transmitted by means of the internal communication bus A to the management module of the switching unit 120. More particularly this signal Busy(7:1) is injected into the input/output table 122 in FIG. 8, and into the blocks 124 and 127.

The signal Start(7:1), depicted in FIG. 8, is generated by the partitioning block of the bus A denoted 124 and is intended either for the occupation marker 46 for the port of the first type 40 in FIG. 5, or for the occupation marker 78 for the intermediate port 70 in FIG. 7. This signal Start(7:1) indicates to the destination port of the data packet that it is going to receive data. The destination port of the data then responds by activating the signal Busy(7:1) mentioned previously.

The signal Busreq(7:1) is a signal corresponding to a request to transfer data over the internal communication bus A. As depicted in FIGS. 4 and 6, the signal Busreq(7:1) is generated by the reading and processing means of the port of the first type 40 or of the intermediate port 70 depending on the case envisaged. This signal Busreq(7:1) is then sent over the internal communication bus A to the partitioning block of the bus 124 of the management module 120 depicted in FIG. 8, and the selection unit 127.

The signal Portno(7:1) is valid when the signal Busreq (7:1) is activated. This signal Portno(7:1) indicates the destination port of the data packet in which said data are to be written. As depicted in FIGS. 4 and 6, the signal Portno(7:1) is either generated by the reading and processing means of the port of the first type 40 of FIG. 4, or by the reading and processing means 73 of the intermediate port 70 of FIG. 6. This signal is transmitted over the internal communication bus A and is intended for the input/output table 122 of the management module 120 depicted in FIG. 8, and for the selection unit 127.

The signal HRE(7:1) is a reading signal for the buffer and the queue of the receiving means of the port of the first type 40 and of the intermediate port 70, as depicted in FIGS. 4 and 6. This signal, depicted in FIG. 8, is generated by the writing and reading means 126 of the management module 120 and is transmitted over the internal communication bus A to the receiving means 41 and 71 respectively of the port of the first type 40 and of the intermediate port 70.

The signal HWE(7:1) is a writing signal generated by the writing and reading means 126 of the management module 120, transmitted over the internal communication bus A and intended, as depicted in FIG. 7, for the storage means 77 of the sending means 76 of the intermediate port 70.

The clock signal Clk is also conveyed over the internal communication bus A.

The signal IntEmpty(1), as depicted in FIG. 6, comes from the storage means 72 and supplies an indication on the degree of occupation of the latter. This signal, active at the low state, is equal to 0 when the storage means 72 is empty. This signal is sent over the writing and reading means 126 of the management module 120 of FIG. 8.

The signal IntFull(1), as depicted in FIG. 7, comes from the storage means 77 and supplies an indication on the degree of occupation of the latter. This signal, active at the low state, is equal to 0 when the storage means 77 is full. This signal is sent over the selection unit 127 of the management module 120, and over the writing and reading means 126 (FIG. 8).

A description will now be given of the data packet switching method according to the invention.

Figure 12:
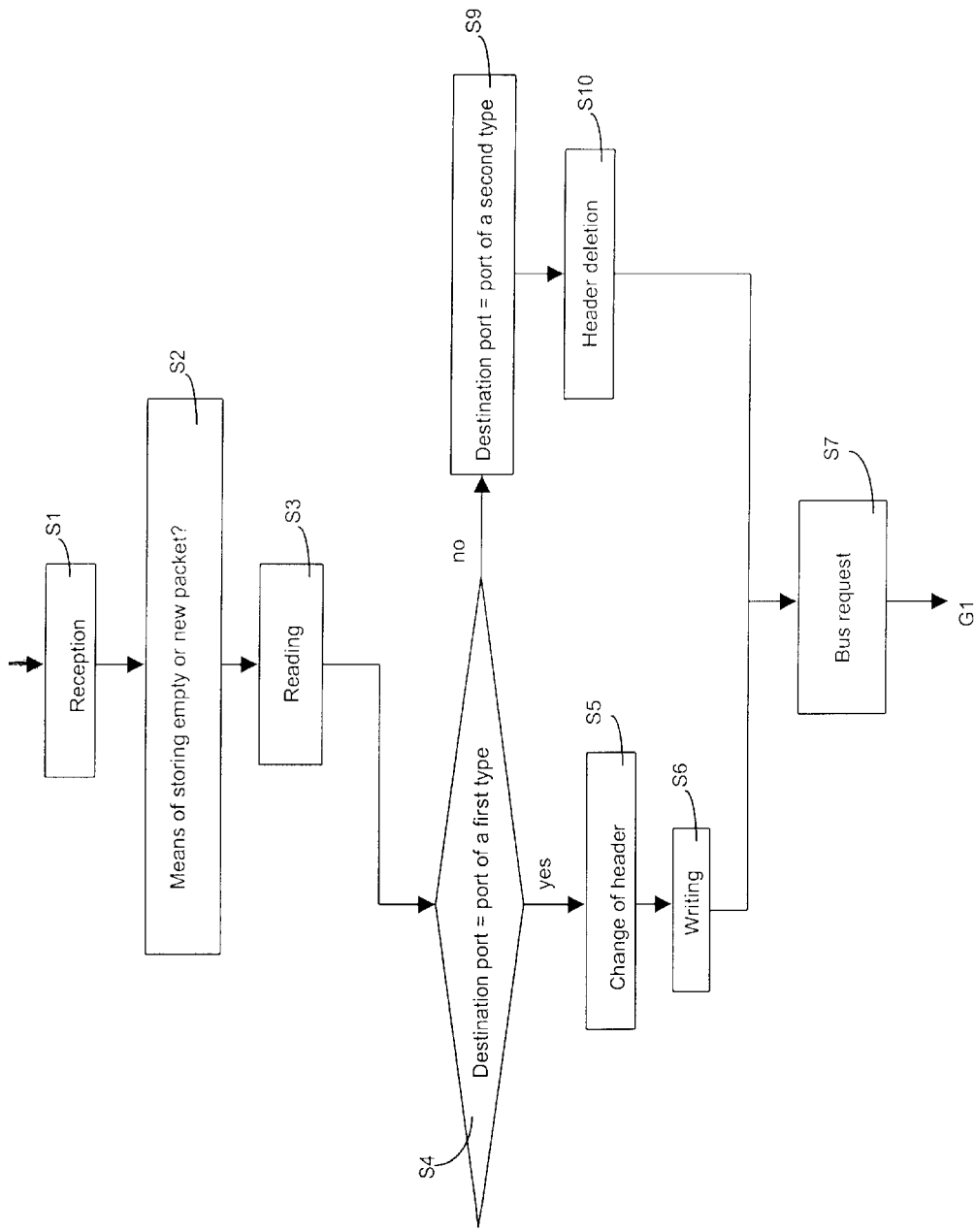
FIG. 12 depicts an algorithm implemented by the reading and processing means 42 of FIG. 4 and by the reading and processing means 73 of FIG. 6.

FIG. 12 depicts an algorithm which is used by the reading and processing means 42 of the receiving and sending means 41 of the port of the first type 40 of FIG. 3a.

Figure 25:
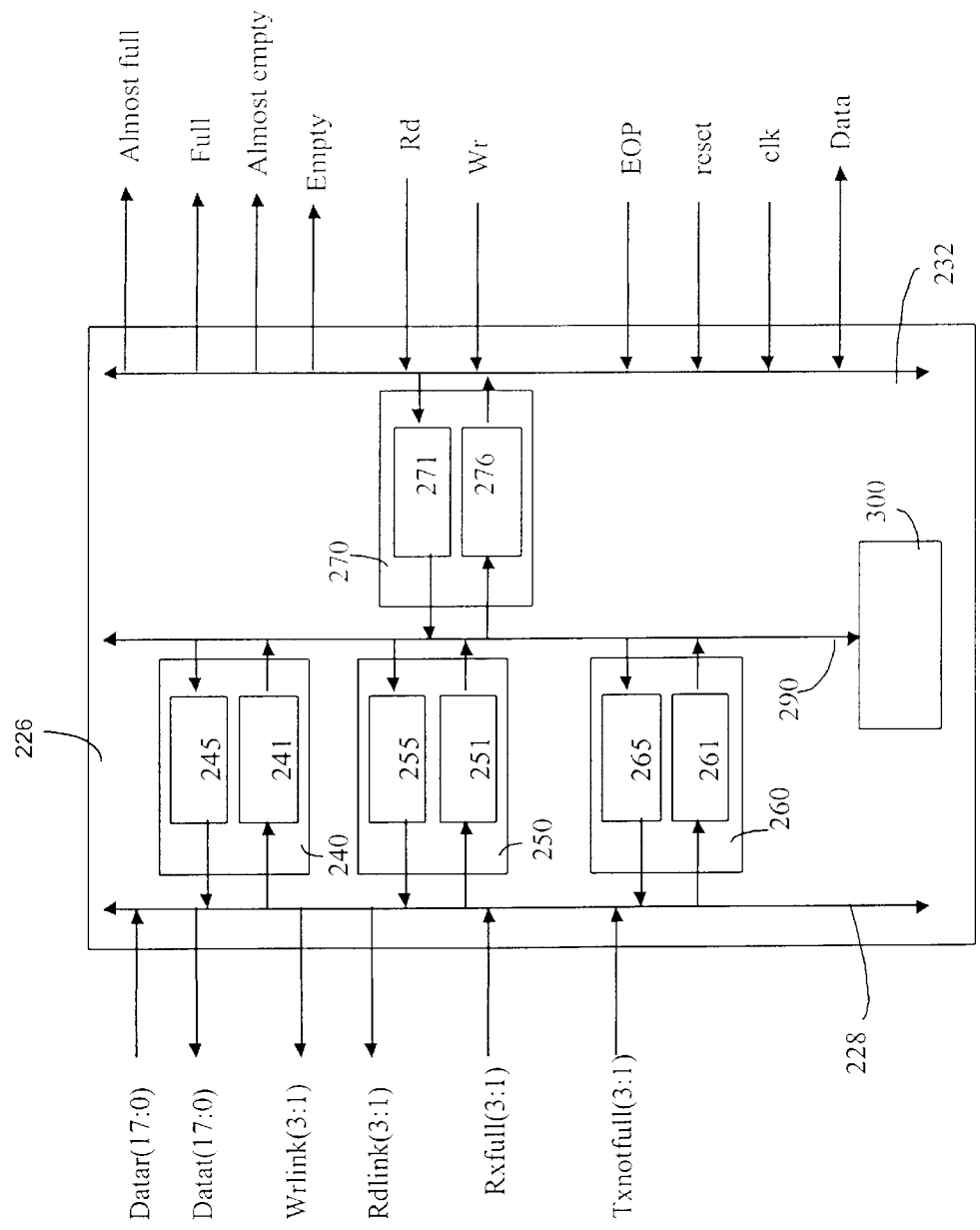
FIG. 25 depicts the switching unit of FIG. 24 with different interface signals.

The algorithm will be detailed further in FIG. 25, which corresponds to a second embodiment of the invention.

When a data packet is received by the port of the first type 40 of the switching unit 26, in accordance with step S1 of the algorithm depicted in FIG. 12, during a step S2 of this same algorithm, it is checked whether it is a case of a new data packet.

In the negative, a new reception of a new data packet is awaited.

In the affirmative, step S2 is followed by a step S3, during which a reading of the first word of the header of the data packet in question is effected.

The signal RdLink(3:1) for reading the data coming from the point to point connection 22 is generated by the reading and processing means 42 of the receiving and sending means 41 of FIG. 4.

Simultaneously, the signal Datar(17:0) representing the data is conveyed by the communication bus B as far as the reading and processing means 42.

Figure 13:
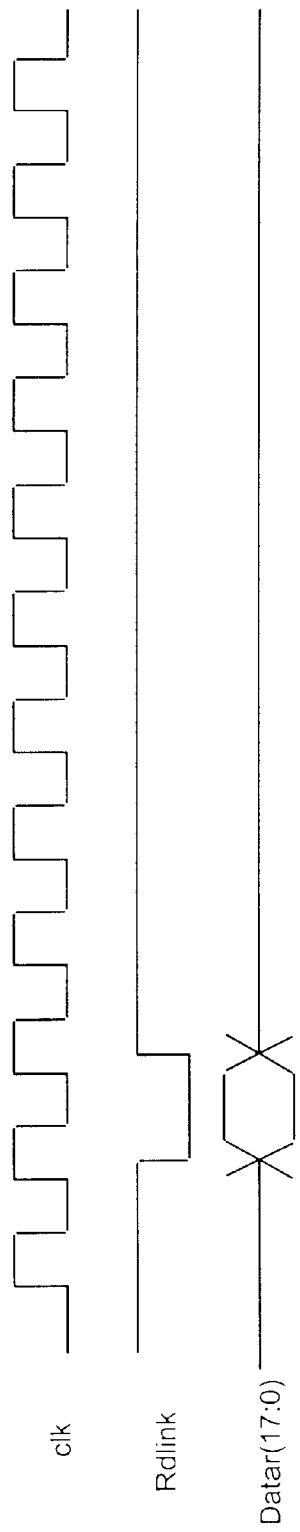
FIG. 13 represents the timing diagrams of the different signals Clk, RdLink and Datar(17:0)

The simultaneity of the signals is also illustrated on the timing diagrams in FIG. 13.

The following steps will depend on the nature of the port for which the data packet is intended.

Step S4 makes it possible to determine the type of port and the number of the port for which a data packet arriving at the port of the first type 40 is intended.

More precisely, according to step S4, the algorithm examines whether the destination port is a port of the first type. In the affirmative, step S4 is followed by step S5, during which the identification data of the data packet which represent the header thereof will be modified.

In order to illustrate the modification which will be made, it is necessary to refer to FIGS. 14a and 14b, which represent an example of a header.

Figure 14A:
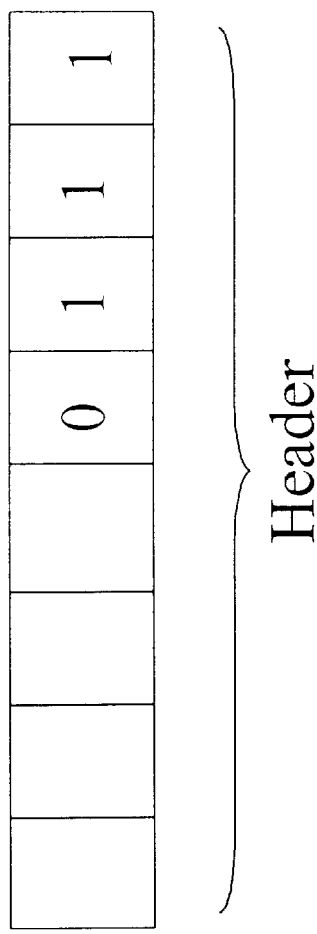
FIGS. 14a and 14b depict respectively the header of a data packet before and after modification thereof.

In the embodiment depicted in FIG. 3a, the number of ports of the first type and ports of the second type is equal to four, which makes it possible to code the number of each port in the header of FIG. 14a in two bits.

In this figure, only the first four bits of the header byte are depicted.

Thus, for example, a data packet received by the port of the first type 40, which corresponds to the port of the switching unit 26 seen from the outside, has, as depicted in FIG. 14a, a header in which the first two bits are "11".

During step S5, a search is made for the first two non-nil bits of the header which correspond to the number of the coded destination port of the data packet.

The ports of the first type 50 and 60 being respectively the second and third ports of the switching unit 26 seen from the outside, the presence of the first two non-nil bits at "11" means that the data packet whose header is depicted in FIG. 14a is intended for the port of the first type 50. The modification to the header made during step S5 of the algorithm depicted in FIG. 12 consists of replacing the first two bits of the header which were used for coding the destination port with two zeros, as depicted in FIG. 14b.

Figure 14B:
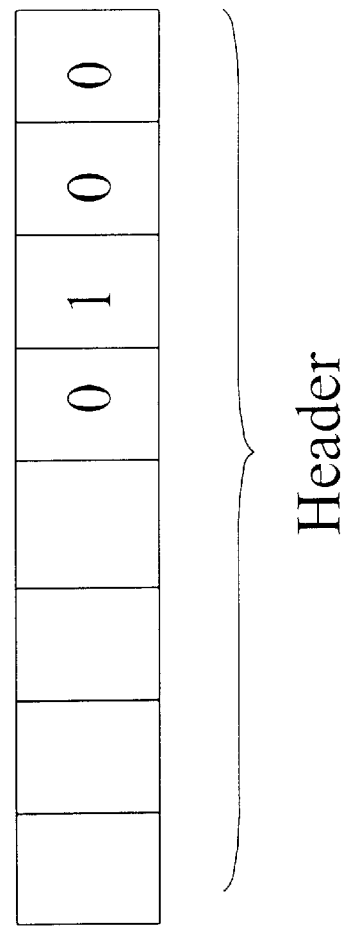

The data packet which will be sent by the port of the first type 50 will have the header depicted in FIG. 14b. The following two bits of the header denoted "01" correspond for their part to the coding of the destination port number of the next switching unit which the data packet under consideration will encounter.

Step S5 corresponds to a step of processing the header of a data packet and, more particularly, to a step of modifying this header adapted to the fact that the previous step S4 determined that the destination port is a port of the first type (40, 50 or 60).

When the switching unit has a smaller number of ports of the first and second types, for example around ten, and the header of the data packet is processed by modifying it when said packet is intended for a port of the first type, then the size of the data serving to identify the ports of the switching units which the data packets under consideration will pass through will be optimised. If the necessary number of bits for coding each destination port is lower than the granularity of the network, then the size of the unit of the header will be able to be reduced compared with the case where the data identifying a destination port of a switching unit is eliminated routinely, whatever the type of destination port.

This advantageously makes it possible to increase the bandwidth for the data packet under consideration.

Thus, for example, a data packet having to pass through five switching units in which each has three ports of the first type and one port of the second type requires one byte for coding all the destination ports through which it must pass. Each port requires only two bits for its identification in the header.

If the number of switching units encountered on the path of the packet is greater than five, it is of course possible to add a second byte for coding the destination ports of the additional switching units.

In addition, the size of the data serving to identify the destination ports of the different switching units which the data packet will encounter on its path will thereby be reduced.

However, this advantage can be used to make it possible, for an equal data size, to identify an additional switching unit in the packet.

Step S5 is followed by a step S6 during which the new modified header of the data packet is written in the queue 43 depicted in FIG. 4.

Step S6 is then followed by a step S7 during which the reading and processing means 42 depicted in FIG. 4 activate the signal Busreq indicating a request to transfer data over the bus A and give to the signal Portno the number of the port of the first type 50 for which the data are intended.

Figure 15:
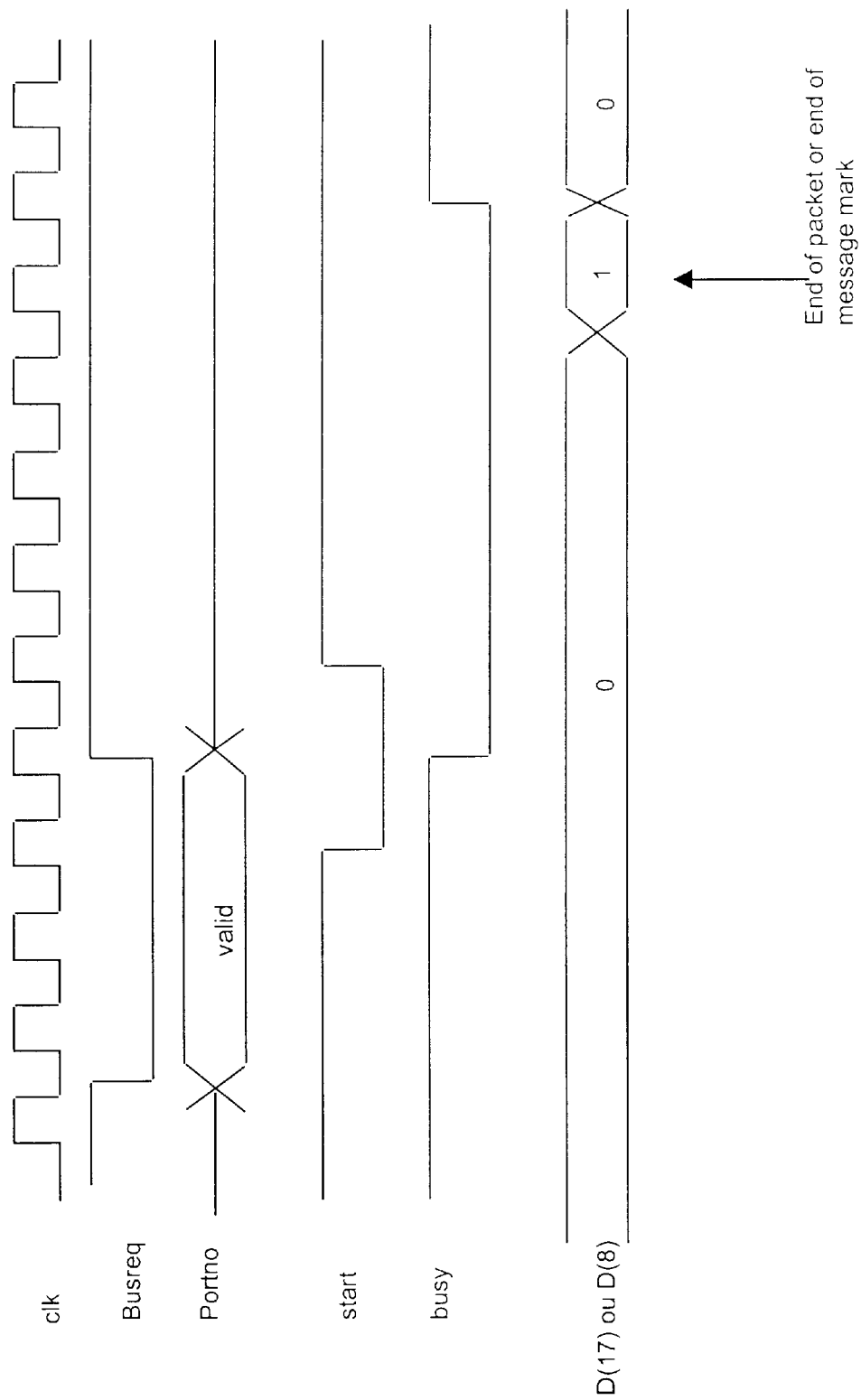
FIG. 15 depicts the different timing diagrams of the signals Clk, Busreq, Portno, Start, Busy and D(17) or D(8)

As depicted in FIG. 15, the timing diagrams of the signals Busreq and Portno show that these are activated simultaneously in time.

Figure 16:
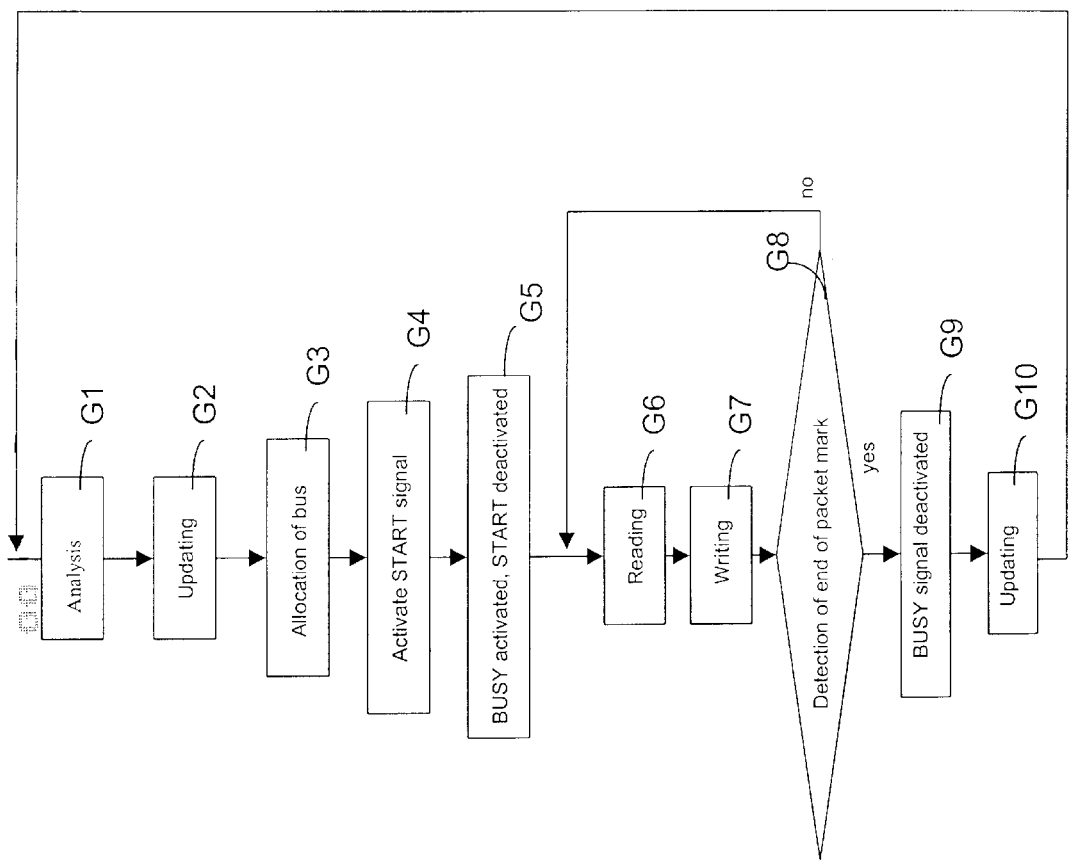
FIG. 16 depicts an algorithm implemented by the management module 120 depicted in FIG. 8.

After step S7 of FIG. 12, the algorithm of FIG. 16 is passed to, which depicts the different steps performed during the management of the switchings in the switching unit 26. This algorithm is implemented in the switching management module 120 depicted in FIGS. 3 and 8.

As depicted in FIG. 8, the signal Busreq is sent to the partitioning block 124 of the bus and to the selection block 127, and the signal Portno is sent for its part for the input/output table 122, and to this block 127.

In accordance with step G1 of the algorithm of FIG. 16, the management module 120 carries out an analysis of the bus requests by examining the signal Busreq which it has just received.

In accordance with step G2 of the algorithm of FIG. 16, the management module checks whether the destination port of the first type 50 is not already occupied by another transfer. To check on this latter point, the management module examines whether the occupation marker of the sending means 55 of the port of the first type 50 has generated a signal Busy intended for the input/output table 122 and the partitioning block of the bus 124. If such is not the case, updating of the table 122 can then be enabled. This updating is more particularly depicted in FIG. 9a. The updating consists of entering in the table the value of the destination port decoded in the header, this value being written opposite the receiving port requesting access to this destination port.

Thus, after the updating, it is clear, in FIG. 9b, that the port of the first type 40 is an input port for the data packet under consideration and that the number of the destination port of this packet is the port of the first type denoted 50.

During a step G3, the management module allocates the bus for the transfer of data requested to the port of the first type 40.

Following step G4, the management module 120 then activates the signal Start for the destination port of the first type 50. This signal is more particularly intended for the occupation marker for the sending means 55 of this port.

In accordance with step G5, the destination port 50, or more particularly its occupation marker, activates the signal Busy of this port and the signal Start is also deactivated. The succession of signals Start and Busy is depicted in the timing diagrams in FIG. 15.

In accordance with step G6 of the algorithm of FIG. 16, the management module 120 then activates the writing and reading means 126, depicted in FIG. 8, which generates the signal Hre(7:1) making it possible to read the memories 43 and 44 of the receiving means 41 of the port of the first type 40 (FIG. 4).

As depicted in FIG. 4, the data represented by the signal Datar(17:1) are first of all transmitted to the reading and processing means 42 and then successively sent to the queue 43 and to the buffer 44 before being transferred over the internal communication bus A.

During step G7 (FIG. 16) the management module writes, in the destination port of the first type 50, data which have just been read in the port of the first type 40.

These data are communicated to the communication bus denoted B in FIG. 3a and are then transmitted by means of this same bus and the network adapter 24 over a point to point connection 22.

Step G7 is then followed by step G8 during which a test is carried out to determine whether an end of packet mark is detected.

In the negative, the management module 120 reawaits reception of a new step G1.

In the affirmative, step G8 is followed by step G9, during which the occupation marker of the destination port of the first type 50 deactivates its signal Busy. This is also illustrated in the timing diagrams in FIG. 15 with regard to the signals Busy and D17 or D8.

As depicted in FIG. 8, the deactivation of the signal Busy which is transmitted to the internal communication bus A is received in the input/output table 122 of the management module 120 and in the partitioning block 124 of the bus, and step G9 is followed by step G10 during which said input/output table is updated. This updating consists of replacing the value of the destination port (port 50) which was occupied by a value "-" whose meaning indicates that said destination port is no longer occupied.

Returning to FIG. 12, after having examined, during step S4, whether the destination port is a port of the first type, if it turns out that said destination port is not in fact a port of the first type, then step S4 is followed by step S9.

In such a case, step S9 is followed by step S10 during which the identification data indicating the destination port of the second type C of the switching unit and which are represented by the header of the data packet are eliminated. This elimination of the data is advantageous in so far as the data packet which will be transmitted will have fewer data, thereby avoiding processing of unnecessary data by the processing unit 34.

Step S10 is then followed by step S7, depicted in the algorithm in FIG. 12, during which the reading and processing means 42 for the data packets request a transfer of data over the internal communication bus A by activating the signal Busreq and giving to the signal Portno the number of the destination port requested (FIG. 4), that is to say the port of the second type denoted C in FIG. 3a.

These signals Busreq and Portno are sent over the internal communication bus A (FIG. 4) and are then transmitted respectively to the partitioning block of the bus 124 and to the selection unit 127 of the management module 120, for the signal Busreq, to the input/output table 122 and to the selection unit 127 of this same module for the signal Portno, as indicated in FIG. 8.

Figure 17:
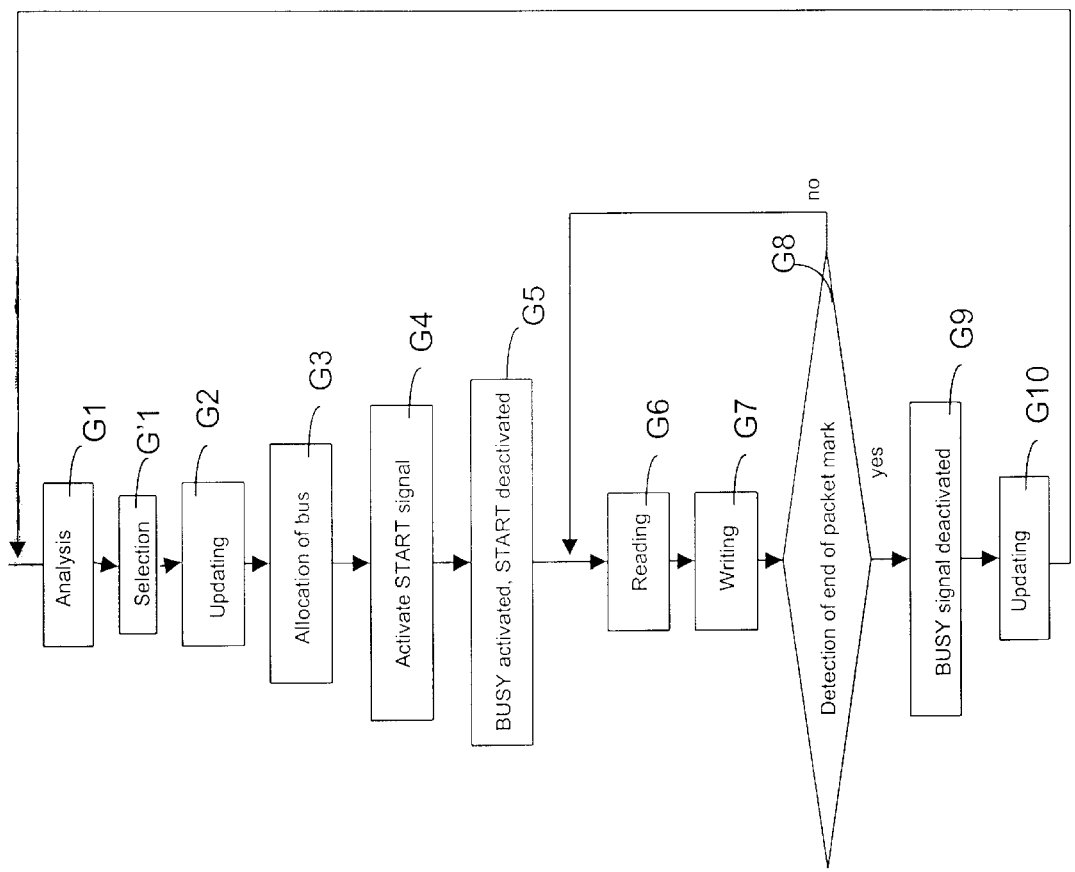
FIG. 17 depicts an algorithm implemented by the management module 120 of FIG. 8 when a data packet is transferred from a port of the first type to an intermediate port and vice versa.

Step S7 of FIG. 12 is then followed by step G1 of the algorithm depicted in FIG. 17 and implemented by the management module 120 of FIG. 8. This algorithm, which will be described below, differs from the one depicted in FIG. 16 by an additional step denoted G'1.

Thus, in accordance with step G1, an analysis of the bus request is made by the partitioning block of the bus 124 as soon as the signal Busreq is received.

Step G1 is followed by a step G'1 during which the selection block 127 of the bus effects a selection of intermediate ports 70, 80, 90 and 100 and of their associated storage means.

This selection is for example made according to the occupation of the storage means which are associated with each of these intermediate ports. The information on the occupation of these storage means is supplied by the signal IntFull coming, for example, from the storage means 77 of the intermediate port.

Let it be assumed that one of the occupation markers of one of the sending means of the different aforementioned intermediate ports activates its signal Busy, which means that the sending means is in the process of receiving a packet. The latter will then be sent over the internal communication bus A to the input/output table 122 of the management module 120, and to the partitioning block of the bus 124, as depicted in FIG. 8. The management module will then deduce therefrom that this intermediate port is already occupied by the sending of a data packet intended for the port of the second type C.

When the signal Busy is activated, the signal IntFull can be activated, in which case the storage means is full, or deactivated, in which case the storage means is partially filled.

There exists another case in which the signal Busy has just been deactivated following the detection of an end of packet or where the storage means has just been filled. In this case, the signal IntFull will be useful to the selection block 127 of the module 120 in order to select an unoccupied intermediate port.

If amongst the four intermediate ports only one of them has activated its signal Busy, then the management module will have a choice between the other three intermediate ports which have not activated their signal Busy nor their signal IntFull. The selection can then for example be made according to the different priority levels which will previously have been allocated to the intermediate ports. Thus the data packet can more particularly be intended for one of the intermediate ports which will have priority.

Assuming that the intermediate port 70 has not activated its signal Busy, nor its signal IntFull, said intermediate port is selected by the block 127.

The selection block 127 (FIG. 8) then updates the input/output table 122 (step G2) by means of the "update" bus, selecting the intermediate port 70 opposite the port of the first type 40 (FIG. 9c).

The block 127 advises, by means of the "request" bus, the partitioning block of the bus 124 of the number of the intermediate port selected.

The partitioning block of the bus 124 then allocates the internal communication bus A for the transfer of data from the port of the first type 40 to the intermediate port 70 (step G3).

It should be noted that, in the case where there are as many ports of the first type as intermediate ports and each port of the first type is associated in a predetermined manner with an intermediate port, then the selection step G'1 of the algorithm consists of seeking, in the input/output table 122, the intermediate port corresponding to the port of the first type at which the data packet was received.

However, this selection takes place only where the signals Busy and IntFull of the intermediate port in question are not activated.

In accordance with step G4 and as depicted in FIG. 8, the partitioning block of the bus 124 activates the signal Start of the occupation marker 78 of the receiving and sending means 76 depicted in FIG. 7.

In accordance with step G5, the intermediate port 70 activates its signal Busy (FIG. 7) and the signal Start is then deactivated. This signal Busy is then transmitted over the internal communication bus A and sent to the input/output table 122 and to the partitioning block of the bus 124 of the management module 120, as depicted in FIG. 8.

The signals Start and Busy follow each other over time as depicted in the timing diagrams in FIG. 15.

The management module 120 activates the writing and reading means 126 depicted in FIG. 8 and generates a signal HRE(7:1) intended to read the memories 43 and 44 of the receiving and sending means 41 of the port of the first type 40 (step G6).

The writing and reading means 126 also generates the signal HWE(7:1) intended to write, in the storage means 77 of the receiving and sending means 76 of the intermediate port 70, the data which will be read from the port of the first type 40.

In accordance with step G6, the data represented by the signal Datar(17:1) in FIG. 4 are successively transmitted through the reading and processing means 42, queue 43 and buffer 44 before being sent over the internal communication bus A (FIG. 4).

The data which are transmitted over the internal communication bus A are represented by the signal D(17:0), are sent (FIG. 7) into the storage means 77 of the intermediate port 70 and are written therein in accordance with step G7 of the algorithm of FIG. 17.

Step G7 is followed by step G8 during which it is detected whether an end of packet mark has presented itself.

If not, the management module 120 then awaits a new step of reading the input port G6.

On the other hand, when an end of packet mark is detected, then step G8 is followed by step G9, during which the occupation marker 78 of the intermediate port 70 deactivates its signal Busy. This information is transmitted over the internal communication bus A and is sent to the input/output table 122 of the management module 120, to the bus partitioning block and to the selection block 127. The deactivation of the signal Busy and the detection of the end of packet mark are illustrated in the timing diagrams in FIG. 15.

Step G9 is followed by step G10, during which the input/output table 122 of the management module 120 depicted in FIG. 8 is updated, the port of the first type 40 no longer having any output port allocated.

As a general rule, the storage means 77 serves to store a part of the data packet transmitted by the internal communication bus A coming from the port of the first type 40. The data generally merely pass through this storage means in order to be transmitted immediately to the communication bus C (port of the second type).

If the logic control unit 30 depicted in FIG. 3a wishes to receive a data packet, then it verifies the signal Empty and reads only if the signal Empty is not activated. The logic control unit can also use the signal AlmostEmpty if it does not wish to read when the storage means contains fewer data than the threshold fixed by said signal. This threshold corresponds for example to four words of 32 bits. The unit 30 also verifies whether a signal EOP has been sent by an intermediate port. The logic control unit 30 analyses the previously mentioned signals by means of the selection block 30b (FIG. 3b). If an end of packet is detected, the unit 30 then sends, by virtue of the reading and writing means 33, a signal Rd(1) which is transmitted by the port of the second type C (communication bus), as far as the storage means 77 (FIG. 7), in order to allow reading of the data contained in said storage means.

The data represented by the signal Data (31:0) in FIG. 7 are then transmitted over the communication bus C in order to reach the logic control unit 30, where the header of the packet is written in the register 30a of FIG. 3b.

The block 30d of the logic control unit 30 then sends, to the data processing unit 34, a request for transferring the data over the PCI bus.

These data are transmitted to the data processing unit 34 by means of the buses 38 and 39 of FIG. 3a.

When the data have been transferred to the data processing unit 34, they are then stored in the memory 36 shown in FIG. 3a.

As shown in FIG. 7, the signal EOP(1:0), indicating the end of the packet of data which have just been transmitted, is also sent over the communication bus C (port of the second type) and to the logic control unit 30, before being transmitted to the data processing unit 34.

Figure 18:
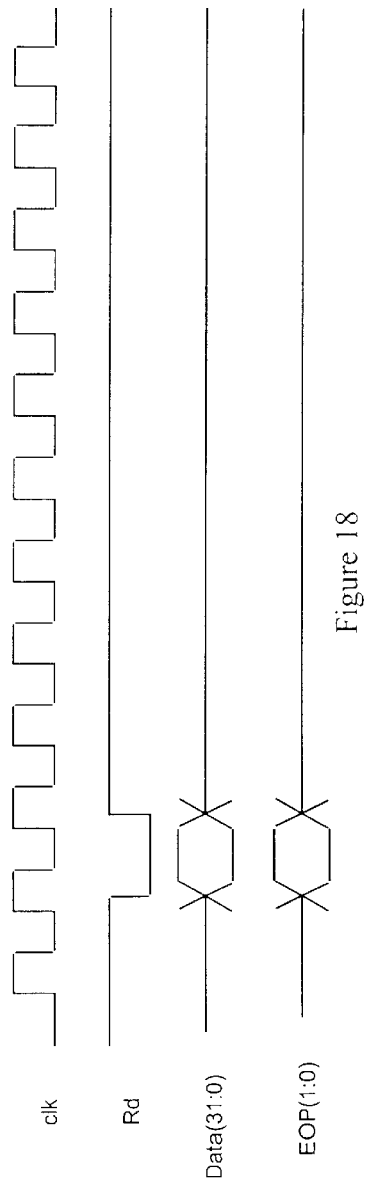
FIG. 18 depicts the timing diagrams of the different signals Clk, Rd, Data (31:0) and EOP (1:0)

FIG. 18 illustrates the change over time in the different aforementioned signals, namely Rd, Data(31:0) and EOP (1:0).

Thus it is clear that the signal Rd is activated at the low state and thus makes it possible to read the data represented by the signal Data(31:0).

It should however be noted that, when the logic control unit 30 is in the process of receiving a first packet of data from one of the intermediate ports of the switching unit 26, then the second packet of data which was, as seen previously, sent from the port of the first type 40 to the intermediate port 70, cannot be immediately transferred over the communication bus C.

This is because this communication bus is already being used for transferring the first data packet coming from another intermediate port.

In this case, the second data packet transferred to the intermediate port 70 is stored in its entirety in the storage means 77 of FIG. 7. Instead of transferring one data packet at a time (this may prove useful when a packet has priority) it is also possible to multiplex the data on the bus C, that is to say to transfer for example 32 bits from a first storage means, and then 32 bits from another, or one block of one and one block of the other, this being managed by the logic controller 30.

Such a multiplexing has already been shown in FIG. 5b.

As a general rule, the time required by the data transferred from the port of the first type 40 to the intermediate port 70 in order to pass through said storage means 77 is sufficient to allow the release of the communication bus C, which can then also be used for transferring other data packets.

The case where a data packet is sent from the port of the second type C to a port of the first type will now be dealt with.

When the data processing unit 34 of FIG. 3a wishes to send a data packet contained in the memory 36, this means writes the header byte of said data packet in the logic control unit 30 at a particular address in the header register block 30a (FIG. 3b), this byte including the coded number of the destination port of the switching unit 26, that is to say one of the ports of the first type denoted 40, 50 or 60.

The logic control unit 30 then performs a step of selecting an intermediate port by means of the selection block 30b of FIG. 3b, for example according to the occupation of the storage means associated with the receiving and sending means of said intermediate port.

To do this, the block 30b of the logic control unit analyses the signals generated by the storage means of the receiving and sending means of the different intermediate ports. The signals analysed are the signals AlmostFull(1) and Full(1) (FIG. 6) which are sent by these storage means, transmitted over the communication bus C (port of the first type). These signals indicate to the logic control unit 30 the state of filling of the different storage means.

When one of the storage means, for example the storage means 72 of the intermediate port 70 (FIG. 6), has sent no signal AlmostFull(1) or Full(1), then the logic control unit 30 selects it by means of the block 30b of FIG. 3b. When the processing unit 34 is ready to send the data, the control unit 30 generates the signal Wr(1) by virtue of the reading and writing means 30c of FIG. 3b and transmits it to the storage means 72 of the intermediate port 70 (FIG. 6).

This signal will make it possible to write, in the storage means, the data sent by the logic control unit 30.

These data are represented by the signal Data(31:0).

When the end of the packet presents itself, the signal EOP(1:0) is also sent to the storage means 72 (FIG. 6).

Figure 19:
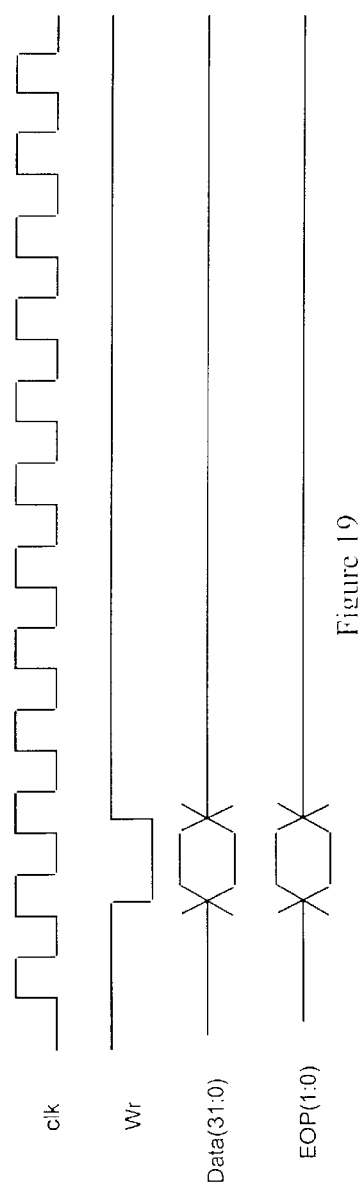
FIG. 19 depicts the timing diagrams of the different signals Clk, Wr, Data (31:0) and EOP (1:0)

The change in the signals Wr, Data(31:0) and EOP(1:0) is illustrated in the timing diagrams in FIG. 19.

It should be noted that the function of the storage means used in the receiving and sending means of the various intermediate ports, for example the storage means 72 depicted in FIG. 6, is to prevent interruption of the flow of data circulating in the switching unit and the processing of said data by the management module 120.

The algorithm of FIG. 12 is also implemented in the reading and processing means 73 of the receiving and sending means 71 of the intermediate port 70.

In accordance with the algorithm of FIG. 12, the reading and processing means 73 implement a reception step (S1) and then examine, during step S2, whether the data received correspond to a new packet.

It is a case of a new packet if an end of packet mark was received previously in the same storage means.

If it is not a case of a new packet, then the reading and processing means 73 await a new reception step (S1).

In the case concerned here, a new packet has been received in the storage means 72 and step S2 of the algorithm of FIG. 12 is then followed by step S3, during which the reading and processing means 73 read the first word of the header of the data packet under consideration.

The reading step is represented in FIG. 6 by an arrow "reading" starting from the reading and processing means 73 and ending at the storage means 72.

As depicted in FIG. 6, the first two bytes of the signal Data(31:0) indicated by the signal D(17:0) are transmitted from the storage means 72 to the reading and processing means 73 by means of the connection referenced 1.

Step S3 is followed by step S4, during which it is examined whether the destination port of the data packet under consideration is a port of the first type.

In the affirmative, step S4 is followed by step S5, during which the two header bits of the data packet under consideration which were used to code the port of the first type for which said packet is intended are replaced by zeros, in a similar fashion to the depiction in FIG. 14b.

The header byte thus modified by the reading and processing means 73 is then transmitted to the queue 74 by means of the connection referenced 0 in FIG. 6. The operation of writing this header byte in the queue 74 is represented in FIG. 6 by the arrow starting from the reading and processing means 73 and ending at said queue 74 (step S6).

Step S6 is followed by step S7 depicted in the algorithm in FIG. 12, during which the reading and processing means 73 of the intermediate port 70 effect a request to transfer data over the internal communication bus A by activating the signal Busreq(1) and giving to the signal Portno the number of the port of the first type for which the data packet is intended (FIG. 6).

These signals Busreq and Portno depicted in FIG. 16 are transmitted over the internal communication bus A and sent respectively to the partitioning block of the bus 124 of the management module 120 in FIG. 8 and to the input/output table 122 in this same figure.

Step S7 of the algorithm in FIG. 12 is followed by step G1 of the algorithm of FIG. 16 implemented by the management module 120 and during which said module analyses the bus request on reception of the signal Busreq.

In the case concerned here, namely the transfer of a data packet from the intermediate port 70 to the port of the first type 40, the management module 120 examines, during a step G2, whether the occupation marker 42 of the port of the first type (FIG. 5a) has sent a signal Busy (5) indicating that said port is occupied in sending or receiving.

If no signal Busy is sent by the occupation marker 46 by means of the internal communication bus A to the input/output table 122 of FIG. 8, then, in accordance with the previously mentioned step G2, the management module 120 updates the input/output table 122 by establishing a match between the number of the intermediate port 70 and that of the destination port 40 (FIG. 9d).

During the following step G3, the management module 120 allocates the internal communication bus A for the transfer of the data packet from the intermediate port 70 to the port of the first type 40.

In accordance with step G4 of the algorithm of FIG. 16, the management module 120 activates the signal Start of the port of the first type 40 which has been selected. As depicted in FIG. 8, the signal Start is sent by the partitioning block of the bus 124, transmitted by means of the internal communication bus A to the occupation marker 46 of the port of the first type 40 depicted in FIG. 5a.

The occupation marker 46 then activates, at the following clock signal (FIG. 15), the signal Busy which is transmitted by the internal communication bus A to the input/output table 122 of the management module 120, in accordance with step G5.

At the following clock signal (FIG. 15) the signal Start is deactivated.

The management module 120 then, in accordance with step G6, reads the data at the intermediate port 70 after having verified that the signal IntEmpty is not activated. This reading is effected by the sending of a signal HRE(7:1) sent, as depicted by FIG. 8, by the writing and reading means 126 of said management module, and intended for the tri-state buffer 75 and the queue 74 of the receiving and sending means 71 depicted in FIG. 6.

The data represented by the signal D(17:0) in FIG. 6 are then transmitted from the queue 74 to the buffer 75 and to the internal communication bus A.

As depicted in FIG. 5a, the data flow control unit 47 sends a signal WrLink(1) over the communication bus B in order to indicate to the latter that data will be transferred over said bus.

The flow control unit 47 consists of sending data to the network adapter only when the latter can receive them, that is to say, for example, when the storage means internal to this adapter are not full.

The management module 120 then executes step G7 of the algorithm of FIG. 16 enabling writing of the data represented by the signal Datat(17:0) of FIG. 5a of the internal communication bus A over the communication bus B.

Figure 20:
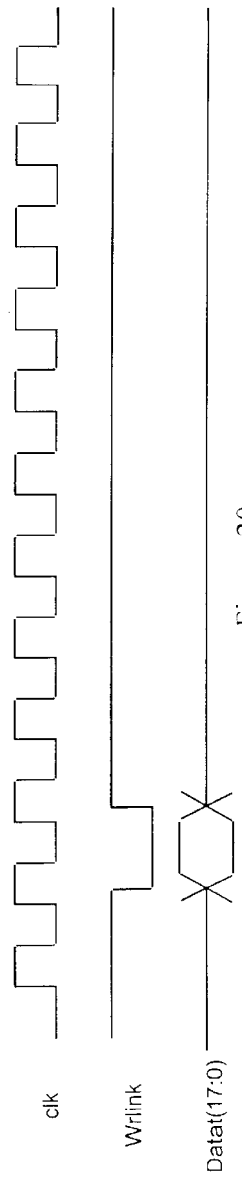
FIG. 20 depicts the timing diagrams of the different signals Clk, WrLink, Datat(17:0)

As depicted in FIG. 20, the signal Datat(17:0) is transmitted when the signal WrLink is activated at the low state.

When the transfer of the data packet from the intermediate port 70 to the port of the first type 40 has been effected, and when the end of packet mark has been detected in accordance with step G8 of the algorithm of FIG. 17, then the occupation marker 46 of the port of the first type 40 deactivates its signal Busy (Step G9) and the latter is transmitted by the internal communication bus A on the one hand to the input/output table 122 and on the other hand to the partitioning block of the bus 124 of the management module 120 (FIG. 8).

The input/output table 122 is then updated in accordance with step G10 of the algorithm of FIG. 17, and the management module 120 then awaits a new step G1 of bus request analysis.

Returning to FIG. 16, if an end of packet mark has not been detected during step G8, then the management module 120 awaits a new step of reading G6 of the input port.

When the data packet has been transferred over the communication bus B (FIG. 5a), it is then transmitted to the network adapter 24 and to a point to point connection 22.

According to a variant, not shown in the Figures, additional storage means are associated permanently with the ports of the first type 40, 50 and 60 of FIGS. 3a and 10.

This advantageously makes it possible to begin to store the data packets arriving from the network in these storage means whilst waiting for the header of these packets to be analysed in the switching unit 26, and more particularly in the reading and processing means of the ports of the first type concerned.

According to another variant, not shown in the figures, additional storage means associated with the ports of the type 40, 50 and 60 are also provided for sending data packets over the network.

This has the advantage of being able to store a few data before sending them over the network if the latter is heavily loaded.

Figure 21:
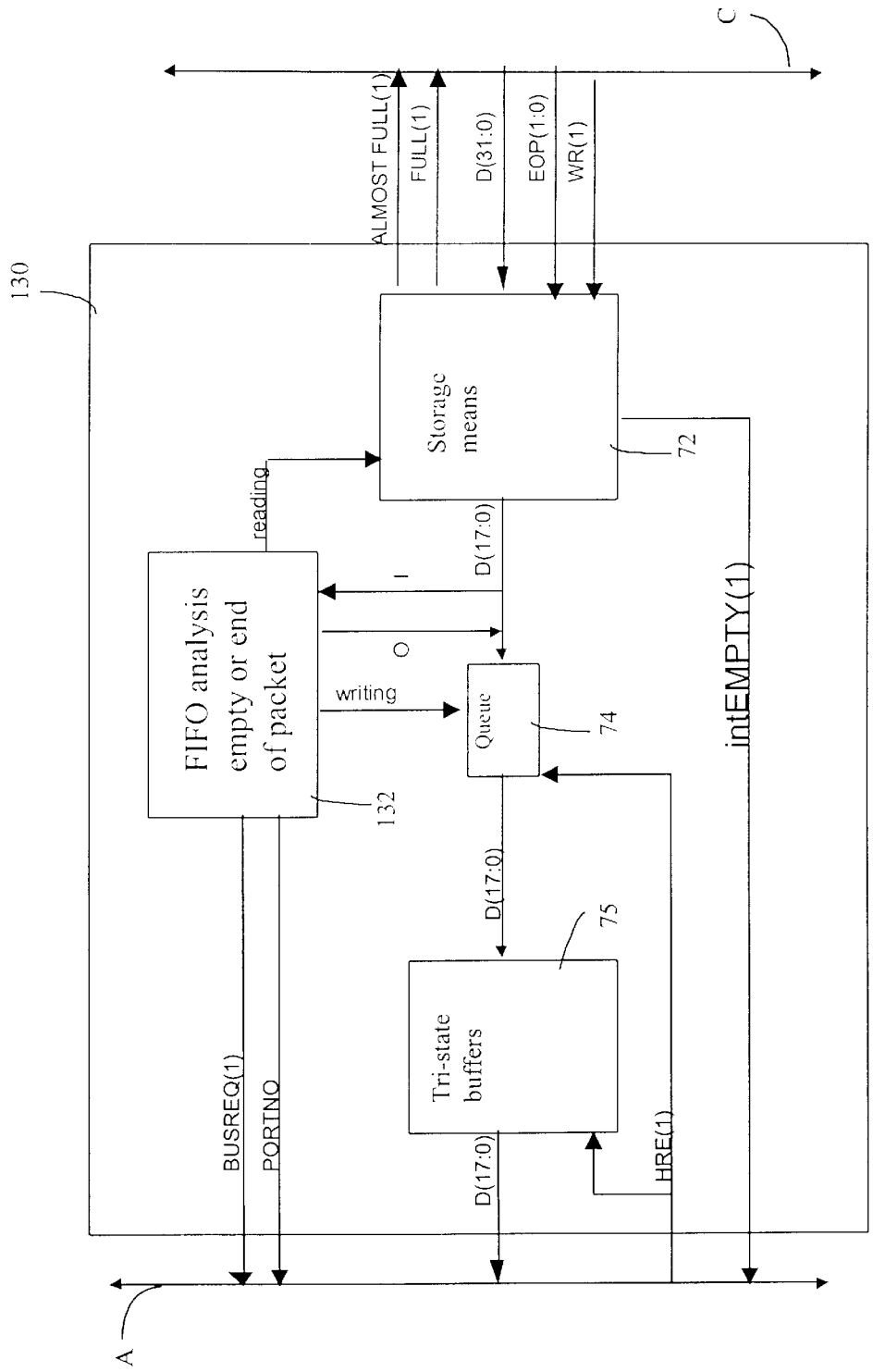
FIG. 21 depicts a variant embodiment of the reception means of an intermediate port.

FIG. 21 depicts a variant embodiment of the receiving and sending means 71 of the intermediate port 70 depicted in FIG. 6.

This variant applies to the case according to which the switching unit has the same number of intermediate ports as ports of the first type. This variant of the switching unit 26 is not depicted in the Figures but corresponds to the case where the intermediate ports are solely the ports 70, 80 and 90, the intermediate port 100 being omitted.

Firstly, the switching of a data packet from the port of the second type C to a port of the first type 40, 50 or 60 is dealt with.

Thus, when the number n of intermediate ports is equal to the number k of ports of the first type and provision is made for each intermediate port to be associated with a port of the first type in a predetermined fashion, then the logic control unit 30, knowing this association, selects the intermediate port corresponding to the port of the first type for which said packet is intended and transfers the data packet directly to said selected intermediate port.

Naturally, as previously described with reference to FIG. 6, the logic control unit verifies that the storage means of the intermediate port concerned are empty by analysing any signals AlmostFull(1) and Full(1).

Because of this association, the header of the data packet which is to be transferred in the switching unit 26 does not make provision for coding the number of the port of the first type for which it is intended.

This represents a saving in processing time in the switching unit and a simplification of the logic of the switching unit.

It is also possible, instead of reducing the size of the identification data of the data packet to be switched, to add, in said data, the address of a destination port of an additional switching unit.

In FIG. 21, the elements which have not been modified compared to those of FIG. 6 have been repeated and keep the same references.

Figure 22:
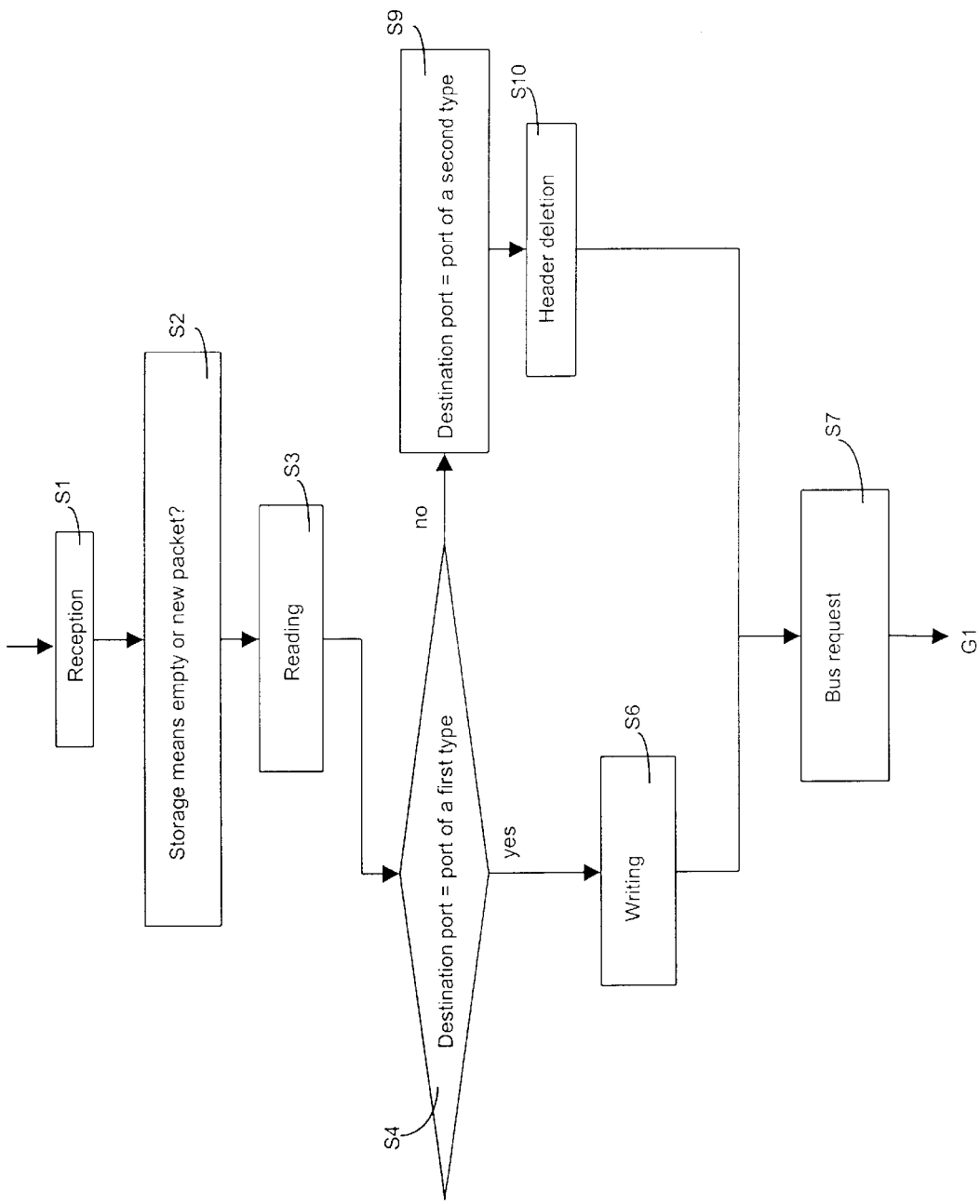
FIG. 22 depicts an algorithm implemented by the means 132 depicted in FIG. 21.

FIG. 22 depicts the algorithm implemented in the receiving and sending means of FIG. 21 and illustrates the cases of transfer from the port of the second type either to a port of the first type, or the port of the second type itself (test). The steps identical to those of the algorithm of FIG. 12 keep the same references.

When the storage means 72 of the receiving and sending means 130 of the variant of the intermediate port 70 is available, then the data is transferred by the logic control unit 30 into said storage means.

In FIG. 21, means referenced 132 replace the reading and processing means 73 for the header of a data packet of FIG. 6. The algorithm of FIG. 22 is implemented by the means 132.

These means 132 determine, after reception of the data packet (step S1), whether the storage means 72 is empty or whether an end of packet presents itself (step S2).

Step S2 is followed by the step of reading the first word of the header (step S3), which takes place as indicated above with reference to FIG. 6. A step 34 of determining the type of port for which the packet is intended is then performed.

The attached port is determined by examining whether or not the header has solely zeros.

If the header does not have solely zeros, then the destination port is of the first type and the means 132 know that the packet is intended for the intermediate port 70 which is associated, for example, with the port of the first type 40.

In accordance with step S6, the means 132 write the header of the packet in the queue 74.

If on the other hand the header contains only zeros, this means that the data packet is intended for the port of the second type C (step S9).

Step S9 is followed by step S10, during which the header is eliminated.

The means 132 then send a bus transfer request by activating the signal Busreq(1) and giving to the signal Portno the number of the port of the first type with which the intermediate port under consideration is associated (step S7).

The procedures of analysing the request for transfer over the communication bus A and of transfer of the data packet are processed as indicated by the algorithm in FIG. 16, which has already been described with reference to the previous figures.

This variant is particularly advantageous in so far as it does not make it necessary to effect the sequencing of the header of the data packet, since the port of the first type for which the packet is intended is not coded in the identification data of said packet, as mentioned previously.

This simplification in fact makes it possible to routinely transfer the data present in the storage means 72 of the intermediate port under consideration to the port of the first type associated therewith.

The transfer of the data packet from the intermediate port whose reception means 130 are depicted in FIG. 21 will not be described here since it exactly repeats the description already given with reference to the preceding figures.

When, still in this same variant, a data packet received at one of the ports of the first type 50, 60, 70 is intended for the port of the second type C, transfer takes place in a similar fashion to that which is described in the case where there are more intermediate ports than ports of the first type.

However, when intermediate ports are considered to be free, following the absence of activated signals Busy and IntFull, then the block 127 selects, in the input/output table 122, the intermediate port which is associated with the port of the first type under consideration.

If this intermediate port is one of those which is free, then the block 127 advises the block 124 of the number of said intermediate port.

The input/output table 122 of FIG. 8 is depicted in FIG. 9e and corresponds to the variant illustrated in FIGS. 21 and 22.

This table shows, on initialisation, that the association between ports is provided for.

However, this can be modified at any time by the processing means 34 and by the logic control unit 30.

Figure 23:
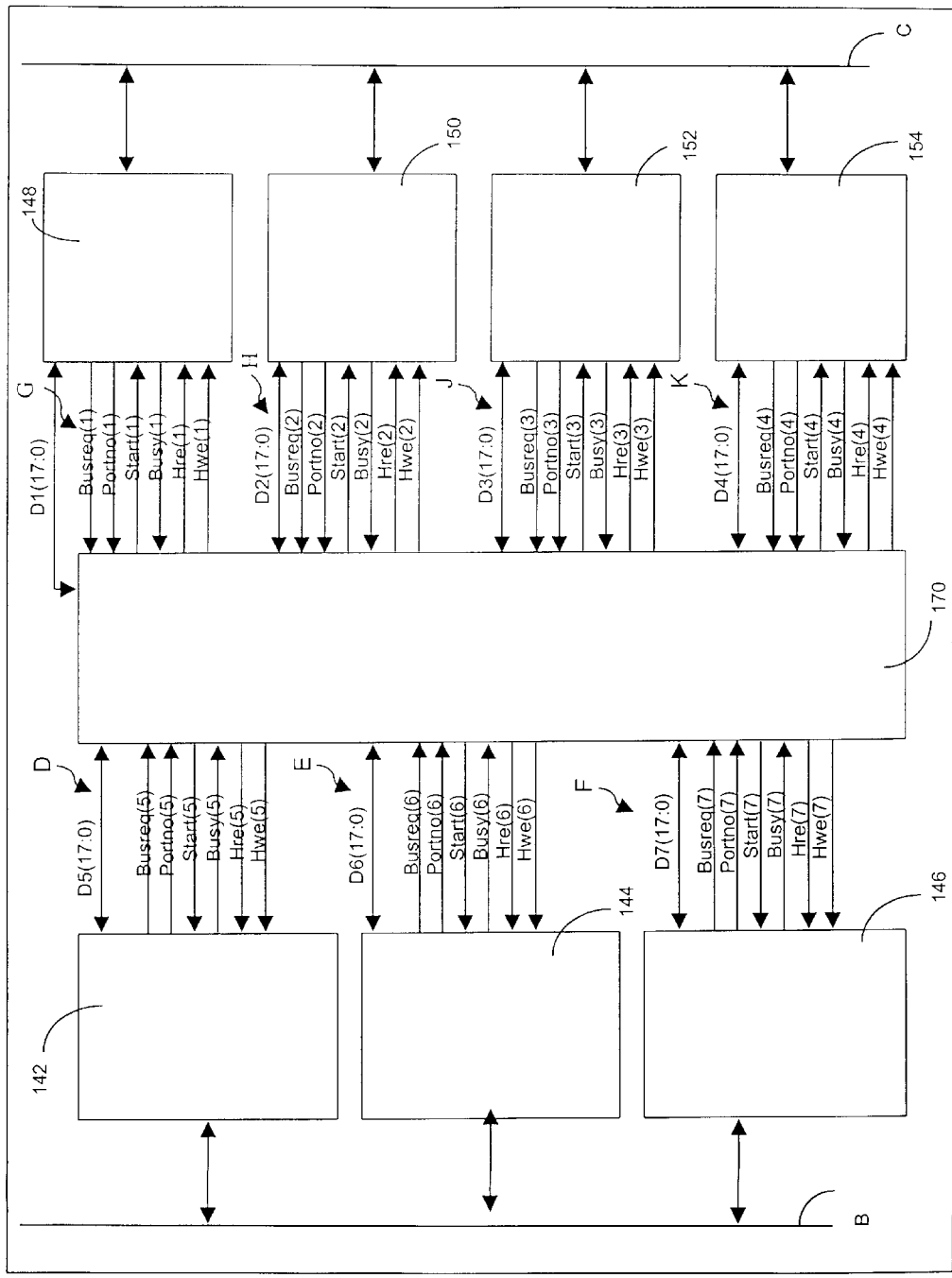
FIG. 23 depicts a second variant embodiment of the switching unit according to the invention.

FIG. 23 illustrates a variant embodiment of the switching unit according to the invention which replaces the switching unit 26 of FIG. 3a.

According to this variant embodiment, the switching unit 140 has three ports of the first type 142, 144, 146 and four intermediate ports 148, 150, 152 and 154. Each of these ports has the same structure as that depicted in the previously mentioned FIGS. 4 to 7.

In a similar fashion to that previously described, the ports of the first type in FIG. 23 are also in communication with the communication bus B of FIG. 3a. In addition, the intermediate ports in FIG. 23 are in communication with the port of the second type denoted C in FIG. 3a.

The switching unit 140 also has a module 170 which is disposed between the ports of the first type and the intermediate ports. This module fulfils notably the functions of the management module 120 depicted in the previously described FIGS. 3 and 8.

In addition, the switching unit 140 has means of transferring data packets between the ports of the first type 142, 144 and 146 and the intermediate ports 148, 150, 152, 154 which have an architecture of the multibus type.

The architecture of the multibus type is formed on the one hand by different buses which are represented by the letters D, E, F, G, H, J and K between the different ports under consideration and the module 170 and, on the other hand, by the module 170 which makes it possible to simultaneously connect together the ports D, C, F to three of the four buses G, H, J, K.

These transfer means have an architecture of the multibus type (known by the term "crossbar").

In the case of a core of a switching unit of the multibus type, it is possible to transfer data simultaneously from several ports, for example of the first type, to several other ports, for example intermediate. Naturally, in such a case, a destination port which is, for example, an intermediate port, can receive a data packet from only one port at a time.

By comparison, with the architecture of the bus type presented in FIG. 3a, it must be emphasised that, in order to achieve the performance achieved by the switching unit 21, the speed of the internal switching bus A depicted in FIG. 3a must be increased compared with the speed of the bus used in the switching unit of FIG. 23.

As depicted in FIG. 23, the signals Busreq, Portno, Start, Busy, Hre and Hwe are transmitted between each port and the module 170.

In addition the different data transmitted between the different ports and the modules 170 are represented by the signals D1 (17:0) to D7(17;0).

It should be noted that the advantage mentioned above with reference to the case where the number of intermediate ports is equal to the number of ports to the first type and where an association is provided for between each port of the first type and an intermediate port is kept when the switching unit under consideration has, as depicted in FIG. 23, an architecture of the multibus type.

All the other characteristics and advantages set out above with reference to a switching unit having an architecture of the bus type remain the same, in so far as they quite obviously do not concern the bus-type architecture.

Figure 24:
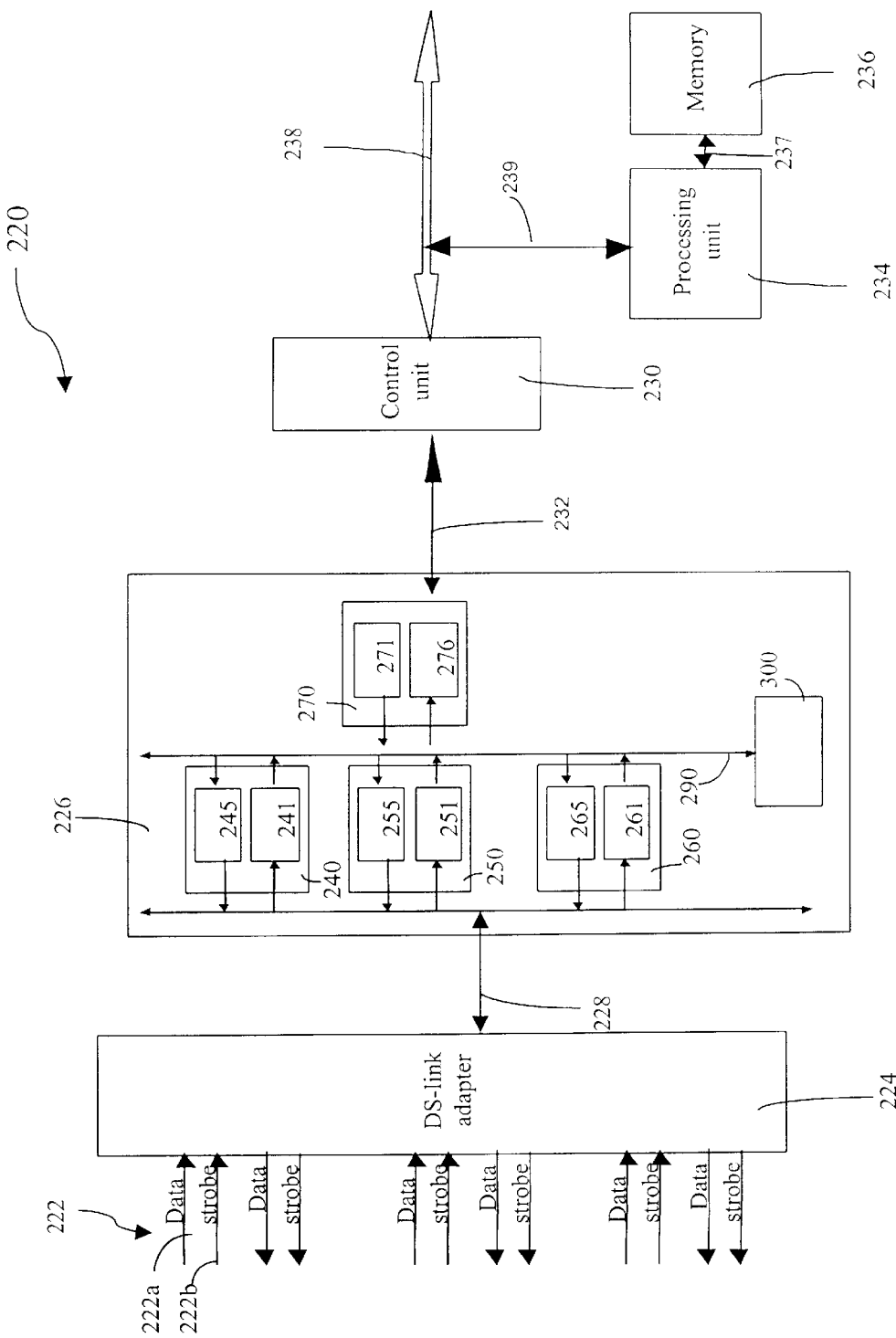
FIG. 24 is a schematic view of a communication node formed by the data processing apparatus FIG. 1 according to a second embodiment of the invention.

As depicted in FIG. 24, according to a second embodiment of the invention, a data processing apparatus 220, which is for example a digital photographic apparatus, has an element referenced 224 which provides the interface between a switching unit 226 and the network 10 (FIG. 1) and which is referred to as the network adapter.

The apparatus 220 can be substituted for the apparatus 20 of FIG. 1.

For this second embodiment of the invention, only the most significant figures have been depicted.

Such an element 224 is for example sold by the company Four Links for Technical Help under the reference C112.

In this figure, in a similar fashion to the connection 22 of FIG. 3a, the connections are represented by two buses: one denoted "Data" and referenced 222a and the other denoted "Strobe" and referenced 222b. This coding, referred to as "Data-Strobe", is described in the document EP 0 458 648.

As depicted in FIG. 24, the switching unit 226, according to a second embodiment of the invention, is connected to the network adapter 224 by means of a bus denoted 228.

The data processing apparatus denoted 220 also has a logic control unit 230 which is in accordance with the more detailed representation in FIG. 3b of the first embodiment, with the exception however of the selection block appearing in this figure and which is not necessary in the embodiment under consideration.

The logic control unit 230 is connected to the switching unit 226 by means of a bidirectional parallel data communication bus 232.

The data processing apparatus 220 also includes a data processing unit 234, for example a processor, and a memory 236, both connected together by means of a bus 237.

The logic control unit 230 is connected to the data processing unit 234 by means of a bus, for example of the PCI type, denoted 238, and a bus 239.

As depicted in FIG. 24, the switching unit 226 has three ports of a first type in this example embodiment.

A port of a first type is defined by the fact that it is adapted to exchange data packets with the network, either directly by means of a point to point connection 222, or indirectly by means of a point to point connection and the network adapter 224.

These ports are also referred to as external ports and are depicted in this figure by blocks referenced 240, 250 and 260.

As depicted in FIG. 24, the switching unit 226 also has a port of a second type formed by a block denoted 270 and the bus 232.

Such a port is defined by the fact that it is adapted to support an internal connection to the communication node 220, with which the switching unit 226 is associated.

The port of the second type, also referred to as an internal port, communicates with the logic control unit 230 by means of the bus 232.

This port conveys data in a parallel form, which has the advantage of being able to dialogue easily with the data processing unit 234.

The switching unit 226 has means of transferring data packets between the ports of the first type denoted 240, 250, 260 and the port of the second type 270, 232.

These transfer means have an architecture of the bus type and are formed by the internal communication bus denoted 290 in FIG. 24.

It can also be envisaged producing these transfer means by an architecture of the multibus type similar to that depicted in FIG. 23 of the first embodiment.

It must be emphasised that the aforementioned ports of the first type and the port of the second type 270, 232 operate in duplex bidirectional mode, that is to say they can transmit the data packets simultaneously and in both directions.

As depicted in FIG. 24, the switching unit 226 also has a module 300 for managing the switching of the data packets which is connected to the internal communication bus 290.

The switching unit 226 is depicted in FIG. 25 without the elements of FIG. 24 but with different interface signals.

More precisely, FIG. 25 indicates the different interface signals, on the one hand between the switching unit 226 and the network adapter 224 and which are conveyed by the bus 228, and on the other hand between the switching unit 226 and the inside of the data processing apparatus or node 220 and which are conveyed by the bus 232.

These interface signals are identical to those described with reference to the first embodiment of the invention.

Figure 26:
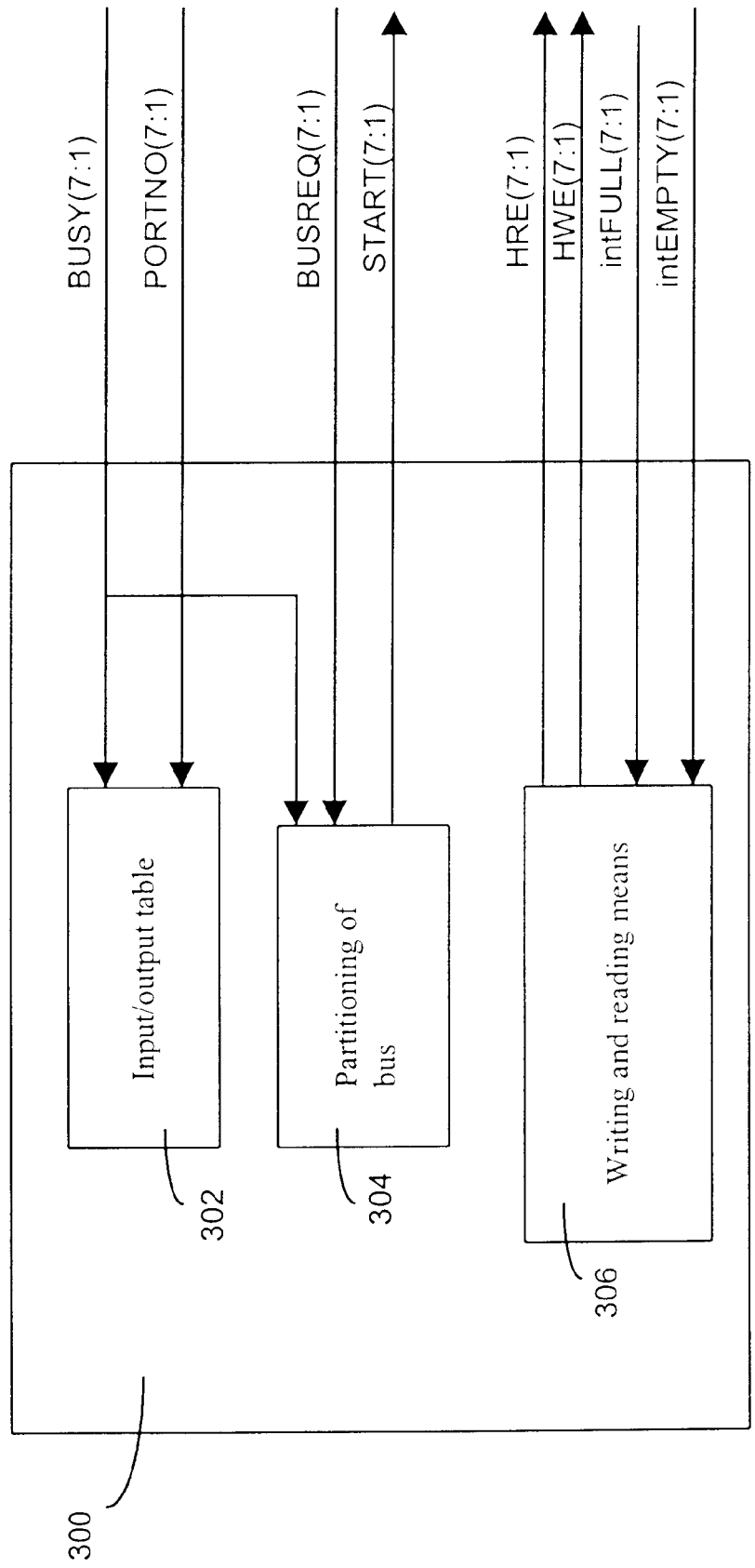
FIG. 26 depicts the management module 300 depicted in FIG. 24.

The management module 300 of FIG. 25 is depicted in more detail in FIG. 26.

Thus, in this figure, the management module has, in a manner identical to the depiction in FIG. 8, an input/output table 302, a partitioning block 304 for the internal communication bus 290 and a writing and reading means denoted 306.

Returning to FIG. 24, each port of the first type 240, 250, 260 has on the one hand means of receiving and sending a data packet which has been transmitted by the point to point connection 222 associated with said ports in the first type and which is intended for a port of the first or second type, and on the other hand means of receiving and sending a data packet intended for the point to point connection 222 associated with this same port.

It should be noted that the data packets coming from or intended for a point to point connection 222 are respectively transmitted by means of the network adapter 224 and bus 228.

As depicted in FIG. 24, the means of receiving and sending a data packet transmitted by a connection 222 are respectively referenced 241, 251, 261.

The means of receiving and sending a data packet intended for a connection 222 are for their part referenced respectively 245, 255, 265.

The receiving and sending means 241 of the port of the first type 240 are identical to the receiving and sending means 251 and 261 of the respective ports of the first type 250 and 260 and are identical to the detailed depiction in FIG. 4 of the first embodiment.

The receiving and sending means 245 of the port of the first type 240 are identical to the receiving and sending means 255 and 265 of the respective ports of the first type 250 and 260 and are identical to the detailed representation in FIG. 5a corresponding to the first embodiment.

As depicted in FIGS. 24 and 25, the port of the second type 270, 232 also has on the one hand means of receiving and sending a data packet coming from the node itself and intended for a port of the first type and on the other hand means of receiving and sending a data packet coming from a port of the first type and intended for said port of the second type.

The means of receiving and sending a data packet coming from the port of the second type are referenced 271.

The means of receiving and sending a data packet coming from a port of the first type are referenced 276.

The detailed representation in FIG. 6 of the receiving and sending means 71 of the intermediate port 70 of FIG. 3a (first embodiment) is the same for the means denoted 271 in FIG. 24.

The detailed representation in FIG. 7 of the receiving and sending means 76 of the intermediate ports 70 of FIG. 3a (first embodiment) is the same for the receiving and sending means denoted 276 in FIG. 24.

Everything which has been described for the first embodiment of the invention concerning the transfer of data packets and the intervention of the management module in this transfer between one of the ports of the first type and an intermediate port and between the port of the second type and an intermediate port remains valid for this second embodiment since a transfer between a port of the first or second type and an intermediate port can be assimilated to a transfer between port of the first type and port of the second type.

The interface signals depicted in FIGS. 25 and 26 of the second embodiment are the same as for the first embodiment and are used in the same way.

However, all the particularities of the first embodiment which are related to the presence of intermediate ports in the switching unit and to the selection of these intermediate ports when data packets are transferred are of course not repeated in this second embodiment, in which the switching unit does not have any intermediate ports.

Figure 27:
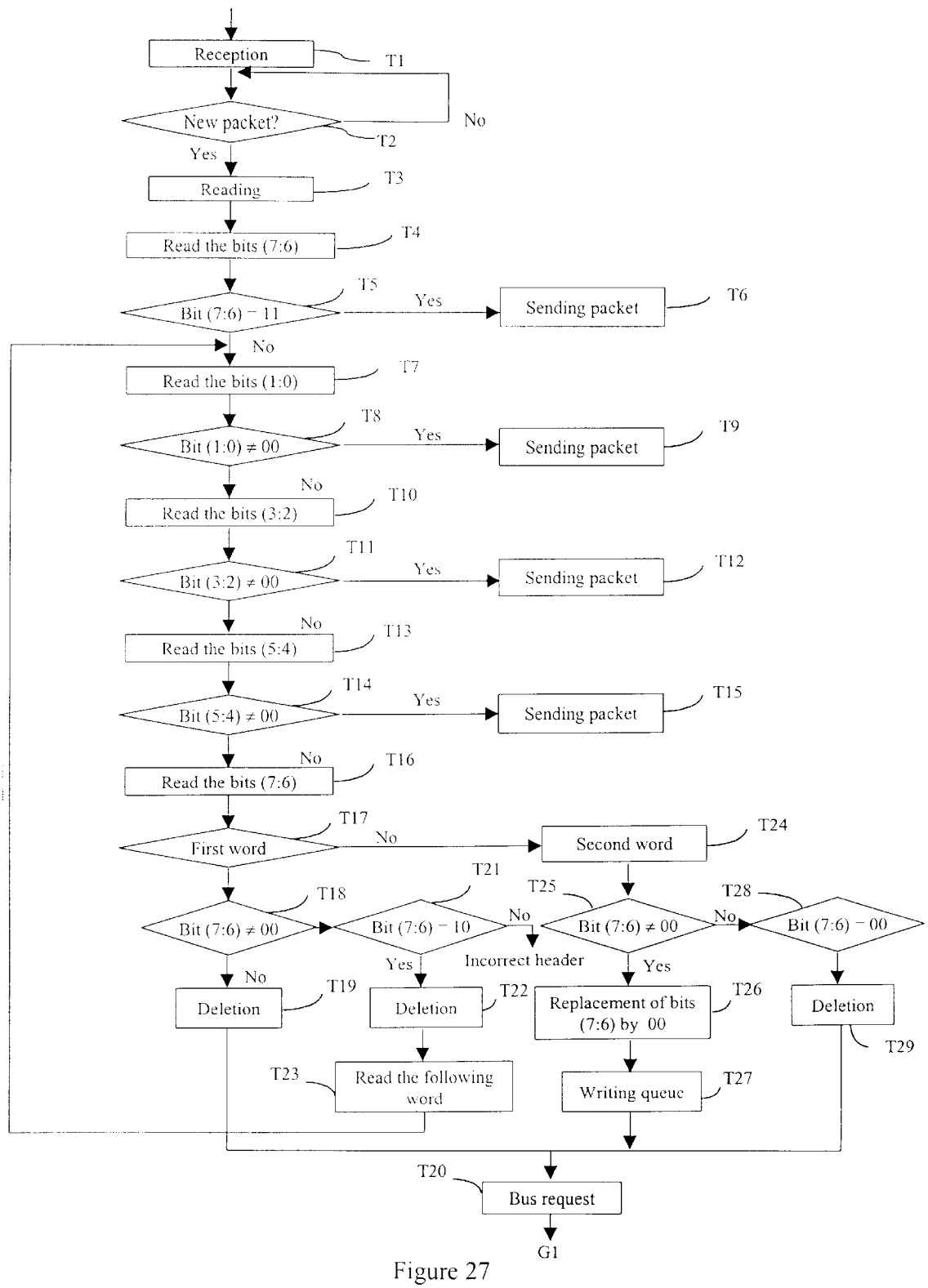
FIG. 27 depicts an algorithm implemented by the reading and processing means 42 of the ports of the first and second types of FIG. 24 according to this second embodiment of the invention.

FIG. 27 depicts a detailed algorithm of the different steps implemented in the receiving and sending means 241, 251, 261 of the ports of the first type and in the receiving and sending means 271 of the port of the second type and, more particularly, in their header reading and processing means.

These reading and processing means have not been depicted since they are identical to those depicted in FIGS. 4 and 6 of the first embodiment, namely respectively the reading and processing means of the header 42 (FIG. 4) and the reading and processing means of the header 73 (FIG. 6).

This algorithm will now be described assuming that a data packet is received (step T1) by a port of the first or second type of the switching unit 226.

After reception of this data packet, during a step T2, it is examined whether it is a case of a new data packet.

If it is not a new data packet, a further reception of a new data packet is awaited.

If it is a new data packet, step T2 is followed by a step T3 during which a first word of the header of the data packet under consideration is read.

It should be noted that, in this example, it is considered that a header is coded in one or two words (step T24), a word being able to be depicted by a byte.

Thus each destination port of a switching unit which the data packet is to encounter on its path is coded in two bits.

It should however be noted that such a coding of the identification data (header) enables the data packet to pass through five switching units counting the source switching unit and the destination switching unit.

As depicted in FIG. 27, step T3 is followed by a step T4 which specifies the modes of reading the first word or byte of the header.

Step T4 makes provision for reading the bits denoted 6 and 7 in the header byte and is followed by a step T5 during which a test is carried out on the value of these bits.

Where bits 5 and 7 take respectively the values 1 and 1, then step T5 is followed by a step T6.

The coding of such a header is depicted in FIG. 28a and means that the data packet under consideration must be switched according to a so-called broadcast switching type, said data packet then being sent to all the ports of the switching unit under consideration.

It should be noted that bits 1 to 5 of the header depicted in FIG. 28a are of course all at 0 since the data packet is routinely sent to all the ports of the switching unit.

Coding of the destination ports is therefore not necessary.

If it is not a case of switching by data packet broadcast, then it is a case of a so-called single sending switching also known as "unicast switching" and whose form of header is represented in FIG. 28b.

Step T5 is then followed by step T7, during which bits 0 and 1 of the header under consideration are read.

The following step T8 checks the value of these bits.

If it turns out that bits 0 and 1 are not both equal to 0, then step T8 is followed by step T9 during which the identification data which were used for coding the destination part of this data packet are processed and the data packet under consideration is then transferred to the destination port of the first type coded by bits 0 and 1.

More particularly, this processing of the data consists of modifying them by replacing the value of bits 0 and 1 by zeros.

On the other hand, if bits 0 and 1 are both equal to 0, then step T8 is followed by a step T10 during which bits 2 and 3 of the header byte under consideration are read.

If it turns out that bits 2 and 3 are not both equal to the pair 00, then step T11 is followed by a step T12.

During this step T12, the identification data of the destination port of this data packet are modified before sending the latter to said destination port of the first type of the switching unit.

More particularly, this processing consists of replacing the value of bits 2 and 3 with zeros.

If the test step T11 on the other hand shows that bits 2 and 3 are both equal to 0, then said step is followed by a step T13 during which bits 4 and 5 of the header byte under consideration are read.

The means of reading and processing of the header of the receiving and sending means of the port under consideration then carry out a test on the value of bits 4 and 5 of the header byte under consideration.

If it turns out that these bits are different from the pair 00, then step T14 is followed by a step T15 during which the identification data identifying the destination port of the data packet under consideration (represented by bits 4 and 5) are then modified before said data packet is sent to said destination port of the first type of the switching unit.

More particularly, these bits 4 and 5 are replaced by zeros.

It should be noted that the steps of processing the identification data of the previous steps T9, T12 and T15 correspond in fact to a modification of said data and not to an elimination thereof.

If it turns out that bits 4 and 5 are equal to the pair 00, then step T14 is followed by a step T16, during which bits 6 and 7 of the header byte under consideration are read. The purpose of this step is to determine the size of the identification data (header) of the data packet under consideration.

According to the value of bits 6 and 7, the method according to the invention makes it possible to determine whether the header consists, for example, of one or two words or bytes (step T17).

If bits 6 and 7 have a value determining a size of the identification data corresponding to a word or byte, then step T17 is followed by a step T18 during which it is checked whether or not bits 6 and 7 are equal to zero.

If it turns out that bits 6 and 7 are both equal to 0 ("unicast switching"), this means that the data packet is intended for the port of the second type 270.

Step T18 is then followed by step T19, during which a processing of said identification data of the data packet under consideration is effected.

More particularly, this processing consists of eliminating the identification data (header) of the data packet under consideration.

The reading and processing means of the port under consideration can then perform a step T20.

During this step the aforementioned means request the transfer of the data packet received on the internal bus 290 by activating the signal Busreq and giving to the signal Portno the number of the destination port requested, namely, in the case which has just been described, the port 270, 232.

This request is then transferred over the communication bus 290 to the management module 200, which then executes the algorithm depicted in FIG. 16 and more particularly step G1 of this algorithm.

The description of this algorithm will not be repeated in the remainder of the description, since it is the same as for the first embodiment of the invention.

If bits 6 and 7 are different from the pair 00, then step T18 is followed by a step T21 during which it is checked whether bits 6 and 7 are equal to the pair 01.

In the affirmative, step T21 is followed by a step T22 during which the identification data corresponding to the first word of the header are deleted.

Step T22 is followed by a step T23 during which the reading and processing means of the port of the first type under consideration read the following word (second word of the header), and step T23 is followed by step T7.

If bits 6 and 7 are not equal to the pair 01 then it is a case of an incorrect header.

Returning to step T17, if the identification data do not correspond to one word but to two words, then step T17 is followed by a step T24.

Each word is for example represented in one byte.

FIG. 28c depicts the coding of a data packet header in two bytes.

The reading and processing means of the port under consideration then perform a step T25 during which it is examined whether bits 6 and 7 of the second byte are different from the pair 00.

In the affirmative, step T25 is followed by a step T26 during which the identification data corresponding to the second word of the header are processed by replacing the value of bits 6 and 7 with zeros.

It should be noted that the adapted processing consists here of modifying the header.

Step T26 is then followed by a step T27 during which the reading and processing means of the port under consideration write the second word of the header in the queue of the receiving and sending means 41 of said port under consideration.

The data packet is intended for a port of the first type.

More precisely, the queue is for example the queue 43 of the receiving and sending means 41 which are depicted in FIG. 4 of the first embodiment and which correspond to the port of the first type 40 (FIG. 3a).

Step T27 is then followed by the previously described step T20 for the request of transfer data over the internal communication bus 290. The signal Busreq is activated and the signal Portno is allocated the number of the output port requested.

If the step T25 shows, on the other hand, that bits 6 and 7 are both equal to 0, then it is followed by step T29 and this means that the data packet is intended for the port of the second type.

In accordance with the following step T29, the identification data are then processed according to the results of steps T25 and T28, and more precisely the identification data of the second header word are then deleted.

As shown by FIG. 27, step T29 is then followed by step T20, which has already been described above.

FIG. 29 illustrates the mechanism used for programming the switching unit 26 or 140 when the latter is, for example, produced by means of a programmable circuit of the family Altera or Xilinx.

As depicted in this figure, the programming of the switching unit 26 or 140 is for example effected by means of a downloading cable denoted 180 connected to a computer 182 by means of its serial or parallel port, depending on the type of technology used for producing the switching unit.

Use will for example be made of the JTAG technology, meaning "Joint Test Action Group", for the downloading of the programming instructions in the form of data.

The programming of the switching unit 26 or 140 can also be carried out by loading the programming instructions in the form of data in a configuration memory 184 (FIG. 29) dedicated to this type of component and of the RAM or ROM or PROM type.

In such a case, on powering up, the data representing the programming instructions for the switching unit are downloaded into it in accordance with a protocol peculiar to the manufacturer of the programmable circuit in question.

The programming of the switching unit can also be effected by means of an input signal denoted 186 containing the programming instructions, and which is sent through a communication network (not shown) such as the Internet, and which is connected to a network adapter itself connected to the programmable switching unit.

Thus, whatever the programming mode used, the switching unit 26 or 140 according to the invention is programmed so as to function in accordance with the input programming instructions.

What is claimed is:

1. A method for switching data packets in a switching unit having a plurality of input/output ports, said switching unit comprising a plurality of ports of a first type and at least one port of a second type, the method comprising the steps of:
receiving a data packet including identification data from a port of the first type, wherein said identification data identifies an output port for which the data packet is intended;
determining the type of output port for which the data packet is intended;
processing said identification data, by deleting the identification data if the data packet is intended for an output port of the second type; and
transferring the data packet to at least said output port.

2. The method according to claim 1, further comprising a step of determining said output port for which the data packet is intended.

3. The method according to claim 2, wherein the total number of ports in the switching unit is $2^m$, the identification data is in the form of a succession of bits, and each of the $2^m$ ports of the switching unit is coded in at least m bits in said identification data, and wherein the step of determining said output port consists of seeking the first m consecutive non-null bits amongst said identification data.

4. The method according to claim 1, further comprising a step of determining a type of switching, broadcast or unicast, that is to be applied to the data packet.

5. The method according to claim 4, wherein said step of determining the type of switching determines the type of switching based on information included in the identification data.

6. The method according to claim 1, further comprising a step of determining the size of the identification data corresponding to the data packet.

7. The method according to claim 6, wherein said step of determining the size of the identification data determines the size based on information included in the identification data.

8. A switching unit for switching data packets between a plurality of input/output ports, comprising:
- a plurality of ports of a first type;
- at least one port of a second type;
- receiving means for receiving a data packet including identification data from a port of the first type, wherein said identification data identifies an output port for which the data packet is intended;
- determining means for determining the type of port for which the data packet is intended;
- processing means for processing said identification data, wherein said processing means deletes the identification data if the data packet is intended for an output port of the second type; and
- transmission means for transferring the data packet to at least said output port.

9. The switching unit according to claim 8, wherein said determining means further determines said output port for which the data packet is intended.

10. The switching unit according to claim 8, wherein the total number of ports in the switching unit is $2^m$, the identification data is in the form of a succession of bits, and each of said $2^m$ ports is coded in least m bits in said identification data, wherein the determination of the output port consists of seeking the first m consecutive non-null bits amongst the identification data.

11. The switching unit according to claim 8, wherein the size of the identification data is chosen to be as small as possible, taking into consideration the number of ports in the switching unit.

12. The switching unit according to claim 8, wherein said determining means further determines the type of switching, broadcast or unicast, that is to be applied to the data packet.

13. The switching unit according to claim 8, wherein said determining means determines the size of the identification data based on information included in the identification data.

14. The switching unit according to claim 8, wherein said at least one port of the second type is connectable to at least one parallel bidirectional data communication bus.

15. The switching unit according to claim 8, wherein the switching unit is connectable to a network in accordance with the standard IEEE 1355.

16. A communication network, comprising at least one switching unit according to claim 8.

17. An information storage means which can be read by a computer or a processor and which contains programming instructions for a programmable processing device, wherein the programming instructions enable the programmable processing device to be configured as a switching unit according to claim 8.

18. An information storage means which can be read by a computer or a processor and which contains programming instructions adapted to cause a programmable processing device to operate so as to implement a switching method according to claim 1.

19. A packet transferring apparatus, in a network, that has a plurality of types of ports to transfer a packet comprising at least identification data representing addresses of a path of the packet through the network, the identification data representing the path of the packet comprising at least a fixed size group of identification data, the transferring apparatus comprising:
- determining means for determining a type of port for which the packet, received from one port, is intended based on a part of the group of identification data;
- modifying means for modifying the part of the group of identification data in the packet;
- transferring means for transferring the modified packet to a type of port for which the packet is intended according to the result of the determining means; and
- deleting means for deleting the group of identification data.

20. The packet transferring apparatus according to claim 19, wherein the modifying means sets the part of the group of identification data in the packet to a predetermined value.

21. The packet transferring apparatus according to claim 19, wherein the modifying means modifies the group of identification data according to the result of the determining means.

22. The packet transferring apparatus according to claim 19, wherein the determining means compares part of the group of identification data with a predetermined value.

23. The packet transferring apparatus according to claim 19, wherein the determining means further comprises searching means for searching for the part of the group of identification data in the group of identification data.

24. The packet transferring apparatus according to claim 22, wherein the determining means compares sequentially the part of the group of identification data with a predetermined value until the part of the group of identification data is different from the predetermined value.

25. Packet transferring apparatus according to claim 19, wherein said deleting means deletes at least the group of identification data when the part of the group of identification data in the group of identification data is equal to a predetermined value.

26. A packet transferring method for a communication node in a network, the node having a plurality of types of ports to transfer a packet comprising at least identification data representing addresses of a path of the packet through the network, the identification data representing the path of the packet comprising at least a fixed size group of identification data, the method comprising the following steps of:
- determining a type of port for which the packet, received from one port, is intended based on a part of the group of identification data;
- modifying the part of the group of identification data in the packet;
- transferring the modified packet to a type of port for which the packet is intended according to the result of said determining step; and
- deleting the group of identification data.

27. The packet transferring method according to claim 26, wherein the modifying step sets the part of the group of identification data in the packet to a predetermined value.

28. The packet transferring method according to claim 26, wherein the modifying step modifies the group of identification data according to the result of the determining step.

29. The packet transferring method according to claim 26, wherein the determining step compares the part of the group of identification data with a predetermined value.

30. The packet transferring method according to claim 26, wherein the determining step further comprises a searching step of searching for the part of the group of identification data in the group of identification data.

31. The packet transferring method according to claim 29, wherein the determining step compares sequentially the part of the group of identification data with a predetermined value until the part of group of identification data is different from the predetermined value.

32. The packet transferring method according to claim 26, wherein the deleting step deletes at least the group of identification data when the part of the group of identification data in the group of identification data is equal to a predetermined value.

33. A switching unit for switching data packets between a plurality of input/output ports, said switching unit comprising:
- a plurality of ports of a first type;
- at least one port of a second type;
- at least one intermediate port associated with each port of the second type;
- storage means associated with each intermediate port; and
- a management module configured to transfer a data packet from an input port of the first type to an output port of the first or second type according to identification data included in the data packet, wherein the transfer of the data packet to the output port of the second type is performed through one intermediate port in accordance with the type of output port and uses the storage means associated to the corresponding intermediate port.

34. The switching unit according to claim 33, wherein the intermediate port associated with the port of the second type bears the same address as said port of the second type.

35. The switching unit according to claim 33, wherein the number of intermediate ports associated to one port of the second type equals the number of ports of the first type, and each one of said intermediate ports is associated to a corresponding one port of the first type.

36. The switching unit according to claim 33, wherein the ports of the first type intermediate type have sending and receiving means for the transfer of data packets.

37. The switching unit according to claim 36, wherein the sending means provides information on its occupation by a busy signal and information on the availableness of the storage means associated to the intermediate ports by a full signal.

38. The switching unit according to claim 37, wherein, if more than one intermediate port are associated to a port of the second type, the management module selects one among the intermediate ports according to their occupation and the availableness of the associated storage means using the busy and full signals respectively.

39. The switching unit according to claim 38, wherein the management module selects one intermediate port among not occupied intermediate ports having available storage means according to a predetermined priority assigned to the intermediate ports.

40. The switching unit according to claim 35, wherein, for the transfer of a data packet from a port of the first type to a port of the second type, the management module selects the intermediate port associated to said port of the first type.

41. The switching unit according to claim 36, wherein the receiving and sending means of ports of the first type comprise means for reading and processing identification data of the data packets.

42. The switching unit according to claim 41, wherein the reading and processing means modifies the identification data if the data packet is intended to be output by a port of the first type, and to delete said identification data if the data packet is intended to be output by a port of the second type.

43. A switching unit for switching data packets between a plurality of input/output ports, said switching unit comprising:
- a plurality of ports of a first type;
- at least one port of a second type;
- an intermediate port associated with each port of the first type and that bears the same address as the port of the first type;
- storage means associated with each intermediate port; and
- a management module configured to transfer a data packet from an input port of the second type to an output port of the first type according to identification data included in the data packet, wherein the transfer of the data packet is performed through the intermediate port and the storage means of the corresponding intermediate port in accordance with the type of the output port.

44. The switching unit according to claim 43, wherein the ports of the first type or intermediate type comprise sending and receiving means for the transfer of data packets.

45. The switching unit according to claim 44, wherein the sending means of intermediate ports provides information on the availableness of the storage means associated with the intermediate ports by a full signal.

46. The switching unit according to claim 45, wherein the management module verifies the availableness of the storage means associated with the intermediate ports using the full signal before the transfer of the data packets.

47. A method of switching data packets in a switching unit having a plurality of input/output ports, said unit comprising a plurality of ports of a first type, at least one port of a second type, at least one intermediate port associated with each port of the second type, and storage means associated with each intermediate port, comprising the steps of:
- receiving a data packet from an input port of the first type;
- determining an output port of the first or second type according to identification data included in the data packet; and
- transferring the data packet to said output port, through the intermediate port associated with said output port using the corresponding storage means associated with said intermediate port, if said output port is of the second type.

48. The switching method according to claim 47, wherein the intermediate ports bears the same address as said port of the second type.

49. The switching method according to claim 47, wherein the number of intermediate ports associated with each port of the second type is equal to the number of ports of the first type, and each one of said intermediate ports is associated with a corresponding one of the ports of the first type.

50. The switching method according to claim 47, wherein the ports of the first type or intermediate type have sending and receiving means for the transfer of data packets.

51. The switching method according to claim 50, further comprising the step of providing information on the occupation of the sending means of the intermediate ports by a busy signal and information on the availableness of the storage means associated to the intermediate ports by a full signal.

52. The switching method according to claim 51, further comprising the step of selecting one among the intermediate ports according to their occupation and the availableness of the associated storage means using the busy and full signals respectively, if more than one intermediate port are associated to a port of the second type.

53. The switching method according to claim 52, further comprising the step of selecting one intermediate port among not occupied intermediate ports having available storage means according to a predetermined priority assigned to the intermediate ports.

54. The switching method according to claim 49, further comprising the step of selecting the intermediate port associated to said port of the first type for the transfer of the data packet from the port of the first type to the port of the second type.

55. The switching method according to claim 50, further comprising the step of reading and processing the identification data of the data packet by the receiving and sending means.

56. The switching method according to claim 55, further comprising the step of modifying the identification data if the data packet is intended to be output by a port of the first type and deleting said identification data if the data packet is intended to be output by a port of the second type.

57. A method of switching data packets in a switching unit having a plurality of input/output ports, said unit comprising a plurality of ports of a first type, at least one port of a second type, an intermediate port associated with each port of the first type and that bears the same address as the port of the first type, and storage means associated with each intermediate port, comprising the steps of:

receiving a data packet from an input port of the second type; and transferring the data packet from the input port of the second type to an output port of the first type according to identification data included in the data packet through the intermediate port associated with said output port using the storage means of said intermediate port.

58. The switching method according to claim 57, wherein the ports of the first type or intermediate type comprise sending and receiving means for the transfer of data packets.

59. The switching method according to claim 58, further comprising the step of providing information on the availableness of the storage means associated with the intermediate ports by a full signal.

60. The switching method according to claim 59, further comprising the step of verifying the availableness of the storage means associated with the intermediate ports using the full signal before transferring the data packets.

* * * * *

UNITED STATES PATENT AND TRADEMARK OFFICE
CERTIFICATE OF CORRECTION

PATENT NO. : 6,847,637 B1
DATED : January 25, 2005
INVENTOR(S) : Anne Abiven

It is certified that error appears in the above-identified patent and that said Letters Patent is hereby corrected as shown below:

Column 8,
Line 20, "packets data" should read -- data packets --; and
Line 22, "in" should read -- to --.

Column 9,
Line 25, "form" should read -- from --.

Column 10,
Line 49, "cases," should read -- cases; --.

Column 16,
Line 4, "second type" should read -- second type C --; and
Line 59, "single" should read -- signal --.

Column 26,
Line 47, "referenced 0" should read -- referenced O --.

Column 29,
Line 17, "step 34" should read -- step S4 --.

Column 30,
Line 56, "D7(17;0)." should read -- D7 (17:0). --.

Column 38,
Line 25, "Packet" should read -- The packet --; and
Line 63, "part of" should read -- part of the --.

Column 39,
Line 28, "type intermediate type" should read -- type or intermediate type --.

UNITED STATES PATENT AND TRADEMARK OFFICE
CERTIFICATE OF CORRECTION

PATENT NO. : 6,847,637 B1
DATED : January 25, 2005
INVENTOR(S) : Anne Abiven

It is certified that error appears in the above-identified patent and that said Letters Patent is hereby corrected as shown below:

<u>Column 40,</u>
Line 36, "ports bears" should read -- ports bear --.

Signed and Sealed this

Twenty-eighth Day of February, 2006

JON W. DUDAS
*Director of the United States Patent and Trademark Office*